Dec. 5, 1950     E. F. JOHNSON     2,532,364
MACHINE FOR ENABLING SYSTEMATIZED
CUSTOMER NOTIFICATION SERVICE
Filed Oct. 1, 1947     15 Sheets-Sheet 1

INVENTOR
Evert F. Johnson,
BY
ATTORNEY

Dec. 5, 1950 E. F. JOHNSON 2,532,364
MACHINE FOR ENABLING SYSTEMATIZED
CUSTOMER NOTIFICATION SERVICE
Filed Oct. 1, 1947 15 Sheets-Sheet 2

INVENTOR
Evert F. Johnson,
BY
ATTORNEY

INVENTOR.
Evert F. Johnson,
ATTORNEY

INVENTOR.
Evert F. Johnson,
BY
ATTORNEY

Dec. 5, 1950  E. F. JOHNSON  2,532,364
MACHINE FOR ENABLING SYSTEMATIZED
CUSTOMER NOTIFICATION SERVICE
Filed Oct. 1, 1947  15 Sheets-Sheet 8
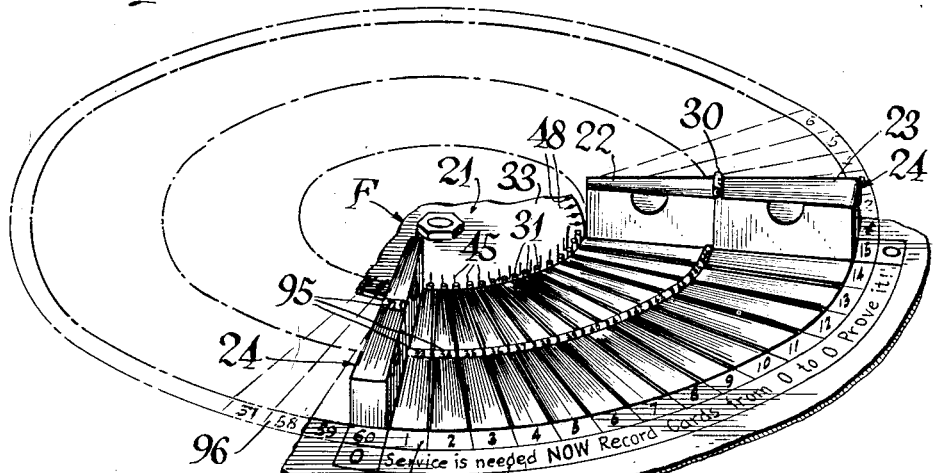
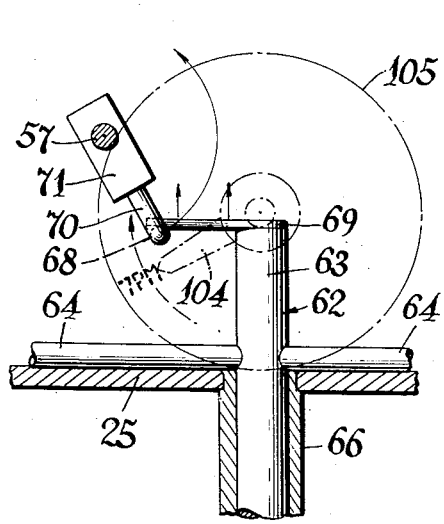
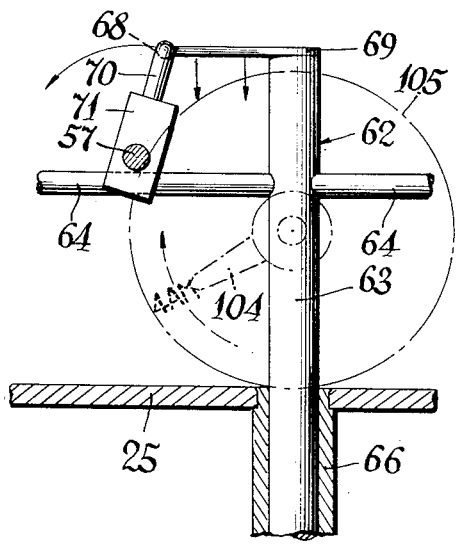
INVENTOR.
*Evert F. Johnson,*
BY
ATTORNEY

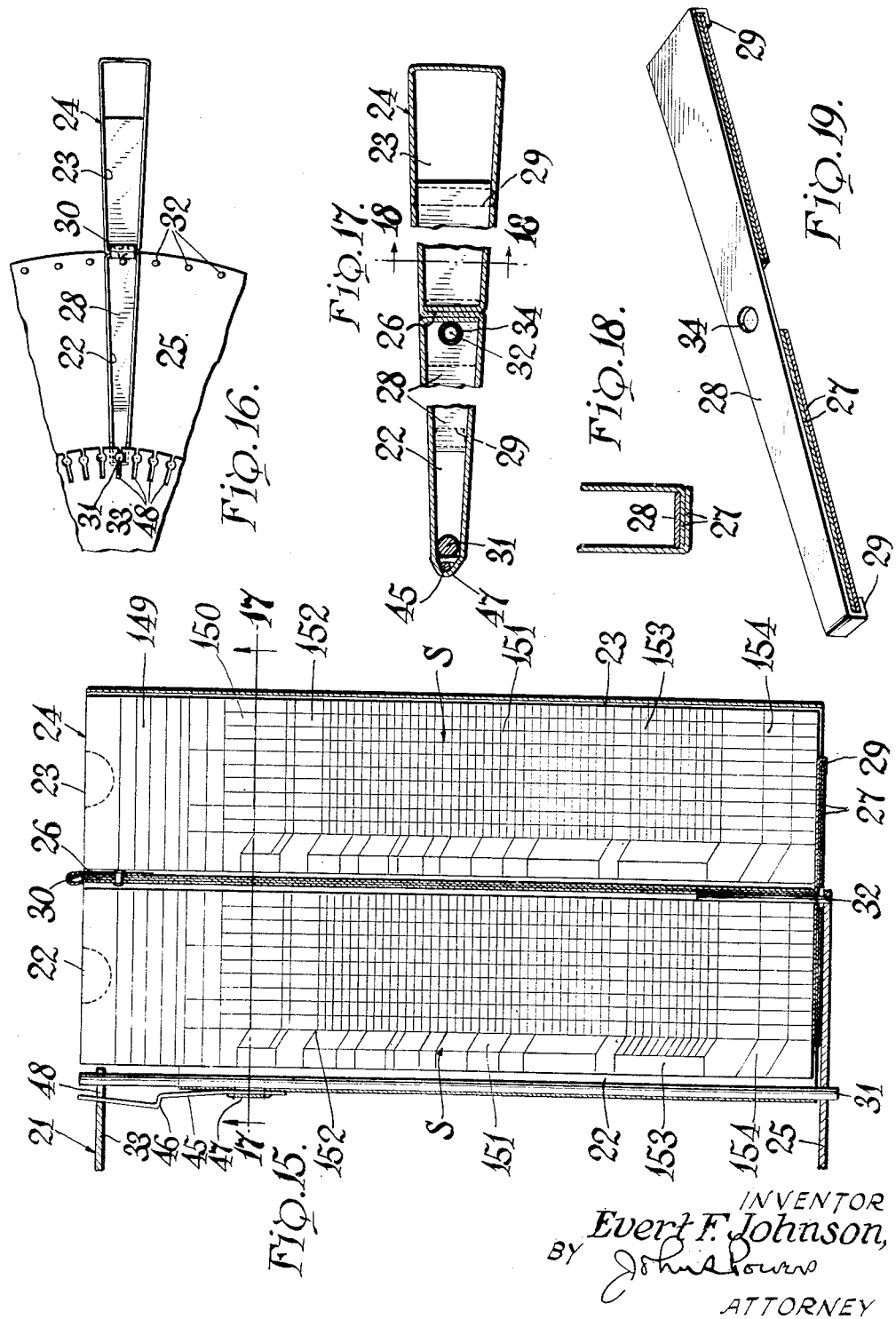

Dec. 5, 1950  E. F. JOHNSON  2,532,364
MACHINE FOR ENABLING SYSTEMATIZED
CUSTOMER NOTIFICATION SERVICE
Filed Oct. 1, 1947  15 Sheets-Sheet 10
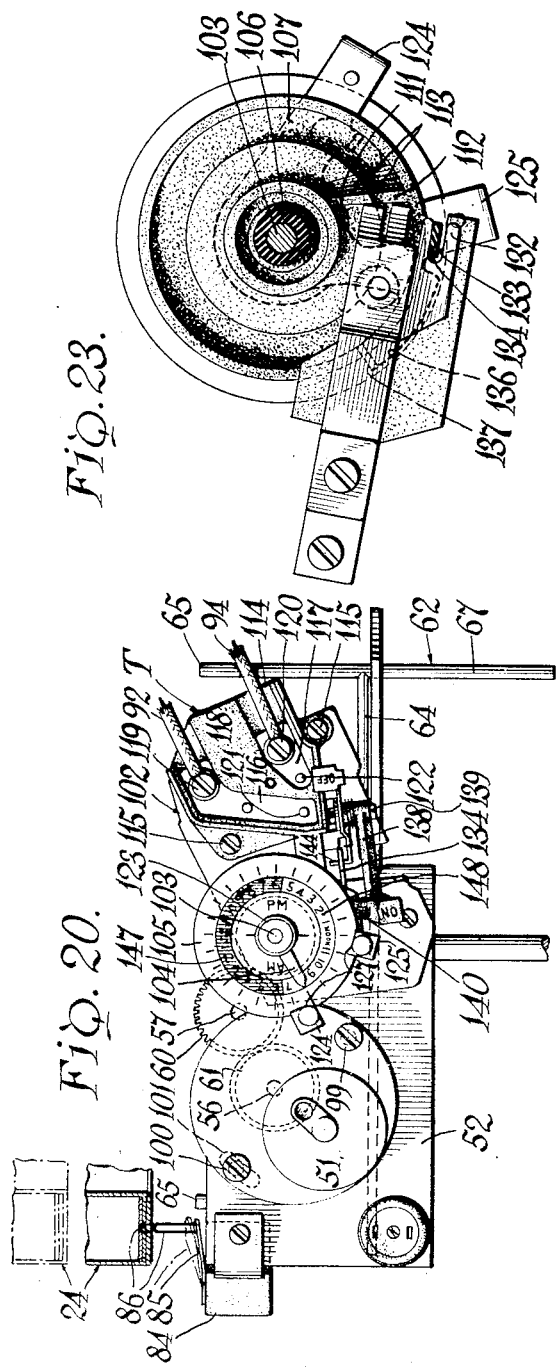
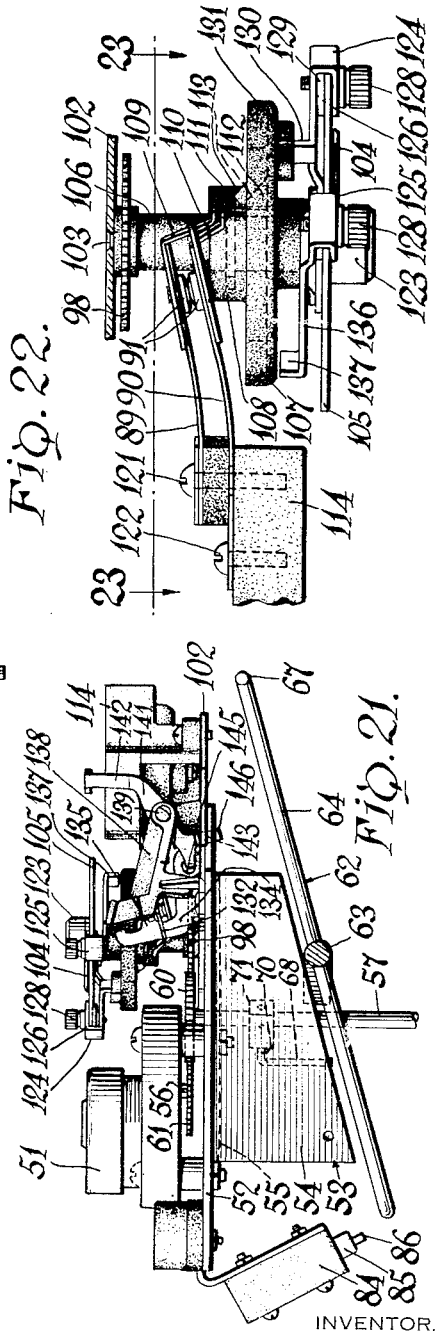
INVENTOR.
*Evert F. Johnson,*
BY
ATTORNEY Dec. 5, 1950
E. F. JOHNSON
2,532,364
MACHINE FOR ENABLING SYSTEMATIZED
CUSTOMER NOTIFICATION SERVICE
Filed Oct. 1, 1947
15 Sheets—Sheet 11
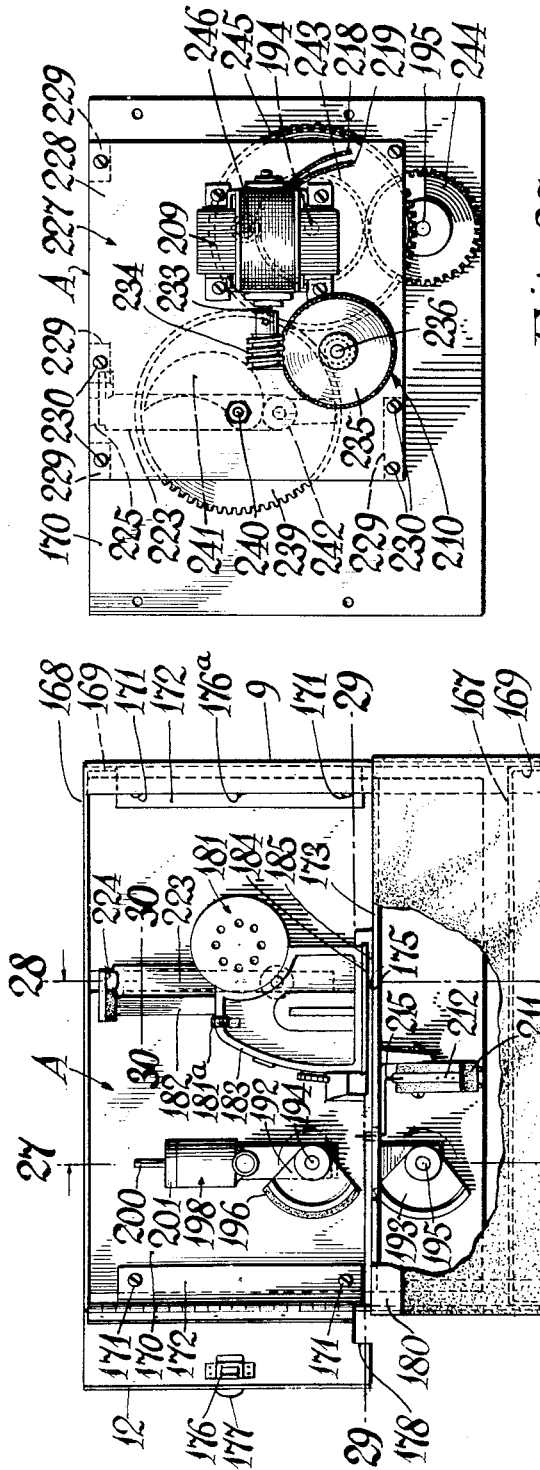
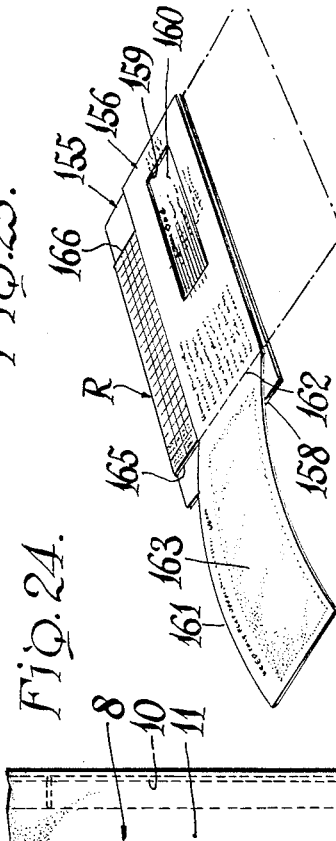
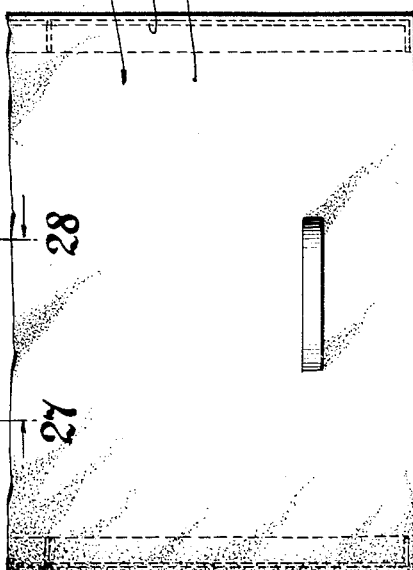
INVENTOR
Evert F. Johnson,
BY
ATTORNEY

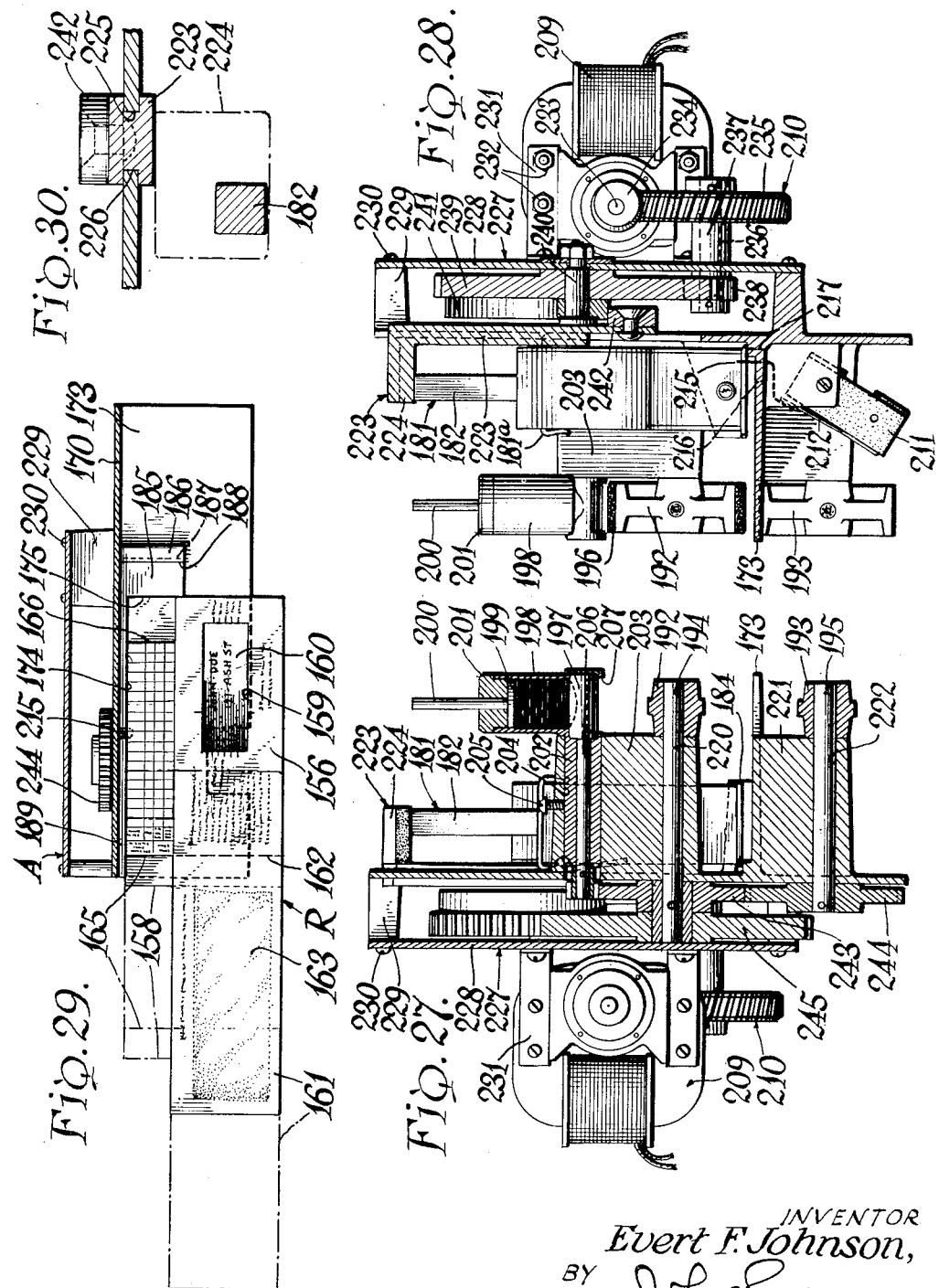

Dec. 5, 1950 E. F. JOHNSON 2,532,364
MACHINE FOR ENABLING SYSTEMATIZED
CUSTOMER NOTIFICATION SERVICE
Filed Oct. 1, 1947 15 Sheets-Sheet 13

INVENTOR.
Evert F. Johnson,
BY
ATTORNEY

Dec. 5, 1950

E. F. JOHNSON 2,532,364

MACHINE FOR ENABLING SYSTEMATIZED
CUSTOMER NOTIFICATION SERVICE

Filed Oct. 1, 1947

INVENTOR.
Evert F. Johnson,
ATTORNEY.

Patented Dec. 5, 1950

2,532,364

UNITED STATES PATENT OFFICE 2,532,364

MACHINE FOR ENABLING SYSTEMATIZED CUSTOMER NOTIFICATION SERVICE

Evert F. Johnson, Oil City, Pa., assignor to The Pennzoil Company, Oil City, Pa., a corporation of Pennsylvania Application October 1, 1947, Serial No. 777,203

21 Claims. (Cl. 161—6)

This invention relates to improvements in a machine for enabling systematized customer notification service and proposes a machine for use with customer "service" cards.

In many enterprises it is important that notifications be sent at proper times to customers, advising them of the particular service they may severally need, and that such notifications be followed up within appropriate time limits in cases where a previous notification or notifications may have been ignored.

The machine of the present invention is ideally used in connection with customer "record" cards corresponding to the "service" cards. The "record" cards, herein disclosed, form the subject of my co-pending application, Serial No. 784,912.

The "record" cards are formed for cooperation with a mechanism under the control of a clerk for addressing mailing pieces and applying postage stamps to them. This mechanism, herein disclosed, forms the subject of my co-pending application Serial No. 792,470.

The machine of the invention, the "record" cards and the address and stamp applying mechanism thus provide a complete system of customer notification which effectively meets all requirements of customer notification service.

As an example of an enterprise in which prompt customer notification is important and where the utility of the invention is of great value reference is made to the services to motor car drivers which are offered by garages, filling stations and similar establishments, this use of the invention being selected, by way of example, for the purposes of illustration and description.

The invention is directed to an improved automatic follow-up card file holding and designating machine (for brevity, referred to as a "filing machine") embodying as companion elements a card carrier and means associated with it and operative daily from demarking a point or points of reference indicative of the location in the carrier of cards which require attention by the clerk in charge of the apparatus for the purpose of customer notification, the times (particular days) of such demarking with reference to particular cards being selected by the clerk according to the particular customer service needed and being automatically observed by the machine, both in connection with the original coincidence of the cards with the point of reference and their repetitious coincidence, as may be necessary in particular cases, at such suitable intervals as may be determined by the clerk.

The card carrier and the associated means for demarking the point or points of reference are relatively movable through an orbital path, the cycle of movement requiring a predetermined number of days.

The coincidence of the particular cards of customers in need of services with the points of reference may be marked either by their "deployment" into a distinguishing (point of reference) position (or positions) at the proper times or intervals as determined by the clerk or by their alinement, at the proper times or intervals similarly determined, with a point (or points) of reference markings included in or serving as a day scale. Both means of demarking the points of reference are preferably employed, that is to say, the cards are both deployed and alined with the day-scale point or points of reference. Thus the means for deploying the cards and the day-scale point or points of reference may be regarded as cumulative elements companion to the card carrier. In the embodiment disclosed the card carrier, as is now considered preferred, is the movable element, i. e., movable through an orbital path, and the means for demarking the points of reference, i. e., the deployment element or elements and the day-scale point or points of reference markings, either or both, are in fixed relation to the rotatable card carrier. Where two points of reference are provided, which as now considered is preferred, it will, of course, be understood that their mutual spacing is constant.

The improvements have for their principal objects a machine of compact nature having ample capacity for customer "service" cards, i. e., a capacity of between 4500 and 5000 cards, which will meet the requirements of the average establishment; a time cycle (period of days) for the complete orbital movement of the companion elements which comprehends the full scale of services which customers may need and which enables the initial point of reference location of a card to be fixed at the end of any predetermined period within the cycle simply by arranging the card with reference to an appropriate period of any number of days, preferably as marked upon a day scale; and to provide, preferably, a "service needed" sector determined by two constantly spaced points of reference and which will conveniently enable repetitious coincidence of the cards with one of the points of reference in such number and at such intervals as may be determined by the clerk, thereby conveniently to enable, as may be necessary or desirable, repetitious and intensive notification to the customer of the particular service which he may need.

In the embodiment of the filing machine now preferred other objects of the invention are:

(1) To maintain the cards in deployed positions until such time as they are utilized by the clerk, regardless of intervening holidays or chance absences, the deploying means being thereupon returned to normal position and the deployed cards being replaced by the clerk in their proper positions in the card carrier.

(2) To provide for daily automatic notifications to the clerk at predetermined times and for a predetermined period of the fact that service cards as coincident with a point or points of reference are awaiting attention.

(3) To distinguish in respect to customer notification between the cards of active and inactive customers and to provide for appropriate notification of inactive as well as active customers.

(4) To provide for flexibility in the selection of the times and intervals of the coincidence of the cards with the point or points of reference in accordance with the particular driving habits of the particular customer, with the notification policies of the particular establishment, and with other facts and circumstances to be taken into consideration.

The customers' "record" cards above referred to enable the identification of the location in the filing machine of the customers' "service" cards, e. g. John Doe's "record" card will at all times enable the identification of the location in the machine of John Doe's "service" card, the position of which in the machine will be changed from time to time in accordance with successive notifications and in accordance with services rendered in response to notifications; and also in each instance furnish a record of the particular notification, notifying material, or services given to the customer on the next previous occasion.

In general, in the use of the machine, the clerk removes the service cards coincident with the point or points of reference, thereupon selects the corresponding record cards, by reference to the service cards ascertains the particular service last given and the particular service or services immediately required, by reference to the corresponding record cards ascertains the particulars of the last previous notification, thereupon selects the appropriate mail matter and properly associates it with the record card, thereupon inserts the record card and associated mail matter into the address and stamp applying mechanism, following the operation of which the clerk removes the record card and associated addressed and stamped mail matter, makes the appropriate entries on the service and record cards, and restores them to their proper files.

In the illustration of the apparatus in the drawings the various elements, severally believed to be of inventive quality as above outlined, are illustrated in embodiments which, as now considered, are preferred. It will, of course, be understood that various structural modifications may be resorted to within the scope of the invention.

The filing machine, the addressing and stamp applying mechanism, and appropriate card storage and filing media may, as herein shown, be conveniently assembled within a single cabinet which provides for instant access to any or all of the elements utilized in the complete system of customer notification.

In the drawings:

Figure 12 is an enlarged perspective view, partly in full lines and partly in broken lines, showing details of the card deployment sector of the filing machine, as viewed from above.

Figure 13 is a detail fragmentary sectional view in the plane 13—13 of Figure 11 showing diagrammatically sundry elements of the filing machine at the initiation of the card deployment operation.

Figure 14 is a view in the same plane of the same elements but showing their relative positions at the completion of the card deploying operation.

Figure 15 is a detail vertical sectional view of the service card holding elements of the filing machine in any radial plane, for example in the plane 15—15, of Figure 12, looking in the direction of the arrows.

Figure 16 is a fragmentary plan view of the service card holding features of the filling machine and sundry associated parts, other parts being omitted for clarity of illustration.

Figure 17 is a horizontal sectional view in the plane 17—17 of Figure 15, looking in the direction of the arrows.

Figure 18 is a detail cross sectional view in the plane 18—18 of Figure 17.

Figure 19 is a detail perspective view of a bottom feature of the service card holders of the filing machine, with associated parts shown in radial section.

Figure 20 is a detail front elevation of a clock mechanism and sundrey associated parts which are employed in connection with the operation of the filing machine.

Figure 21 is a bottom plan view of the structure shown in Figure 20.

Figure 22 is a bottom plan view of the switch mechanism shown in Figure 20.

Figure 23 is a view of the switch mechanism shown in Figures 20 and 23, this view being partly in elevation and partly in section in the plane 23—23 of Figure 22.

Figure 24 is a view in front elevation of the cabinet drawer element and address and stamp applying mechanism which it carries, the drawer element being partly broken away to show details of the mechanism and a hinged panel of the drawer element being shown in open position.

Figure 25 is a rear elevation of the address and stamp applying mechanism.

Figure 26 is a perspective view of a record card with an associated mailing piece shown in broken lines, the record card and the mailing piece being shown in readiness for insertion in operative relation into the address and stamp applying mechanism.

Figure 27 is a detail vertical longitudinal sectional view in the plane 27—27 of Figure 24, looking in the direction of the arrows, this figure more particularly showing the address applying element of the combined address and stamp applying mechanism.

Figure 28 is a detail vertical longitudinal sectional view in the plane 28—28 of Figure 24, looking in the direction of the arrows, this figure more particularly showing the stamp applying elements of the combined address and stamp applying mechanism.

Figure 29 is a horizontal sectional view in the plane 29—29 of Figure 24, looking in the direction of the arrows, this figure also showing the record card and associated mailing piece as inserted into the mechanism.

Figure 30 is a detail horizontal sectional view in the plane 30—30 of Figure 24, looking in the direction of the arrows.

Figure 33 is a schematic plan view of a "service card," showing details thereof, which is employed in direct association with the filing machine as shown in Figure 15, an intermediate part of the card being omitted, as shown by dot and dash lines in order to permit illustration on a sufficiently adequate scale and the lateral dimension of the card being exaggerated (relatively to the showing of the card in Figure 20) for a similar purpose.

Figure 34:
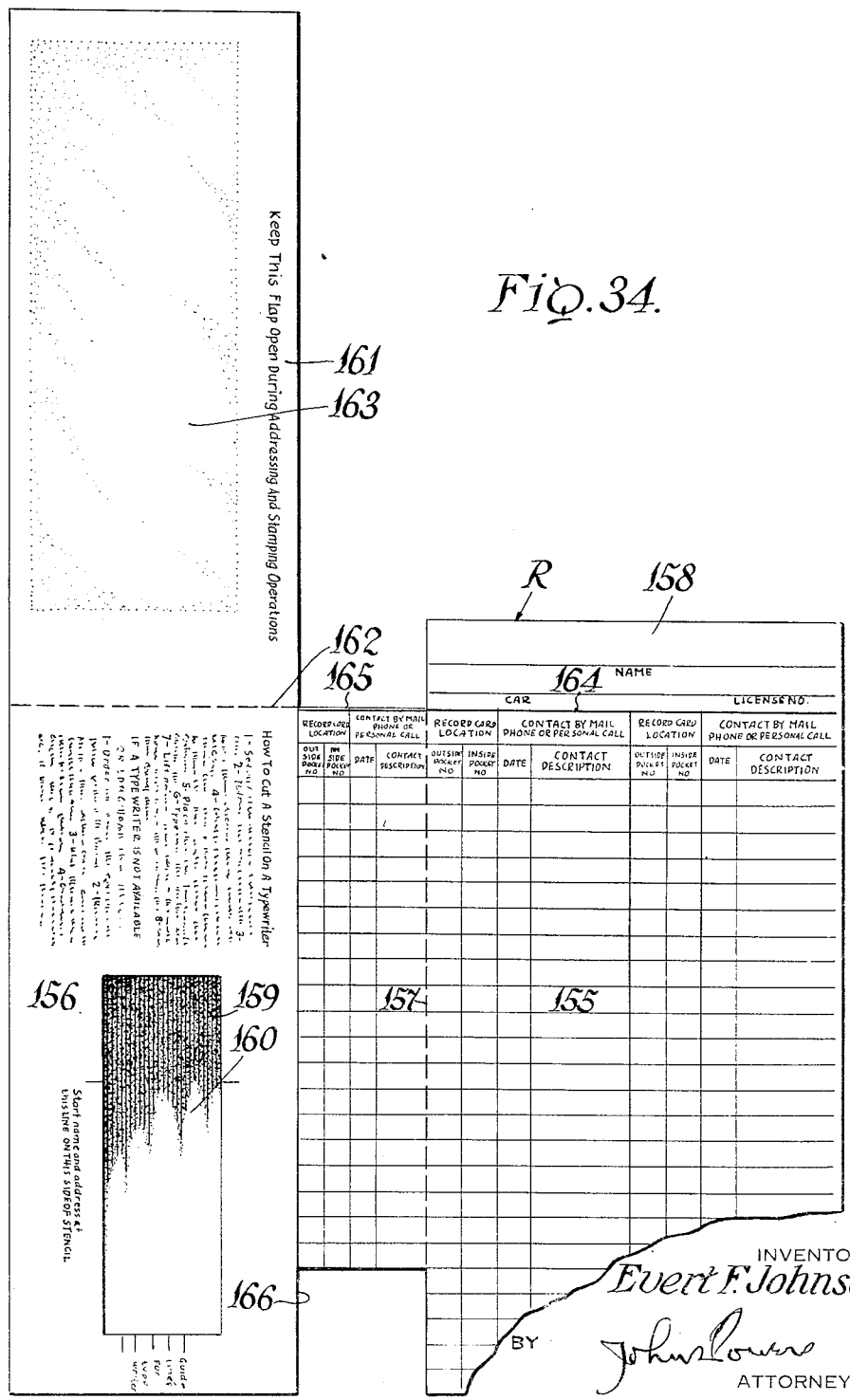

Figure 34 is a plan view of a "record card" used in cooperation with the address and stamp applying mechanism, showing all parts of the card in extended relation.

The cabinet (Figures 1, 2, 3, 6, and 7) is designated generally as C; the filing machine (Figures 1 and 8 to 23 inclusive) is designated generally as F; the address and stamp applying mechanism (Figures 8, 24, 25 and 29 to 32 inclusive) is designated generally as A; the customers' "service" cards, best shown in Figures 15 and 33, are designated generally as S; the customers' "record" cards, as shown in Figures 26 and 34, are designated generally as R; and the time clock control mechanism shown in Figures 20 and 21 is designated generally as T.

Figure 1:
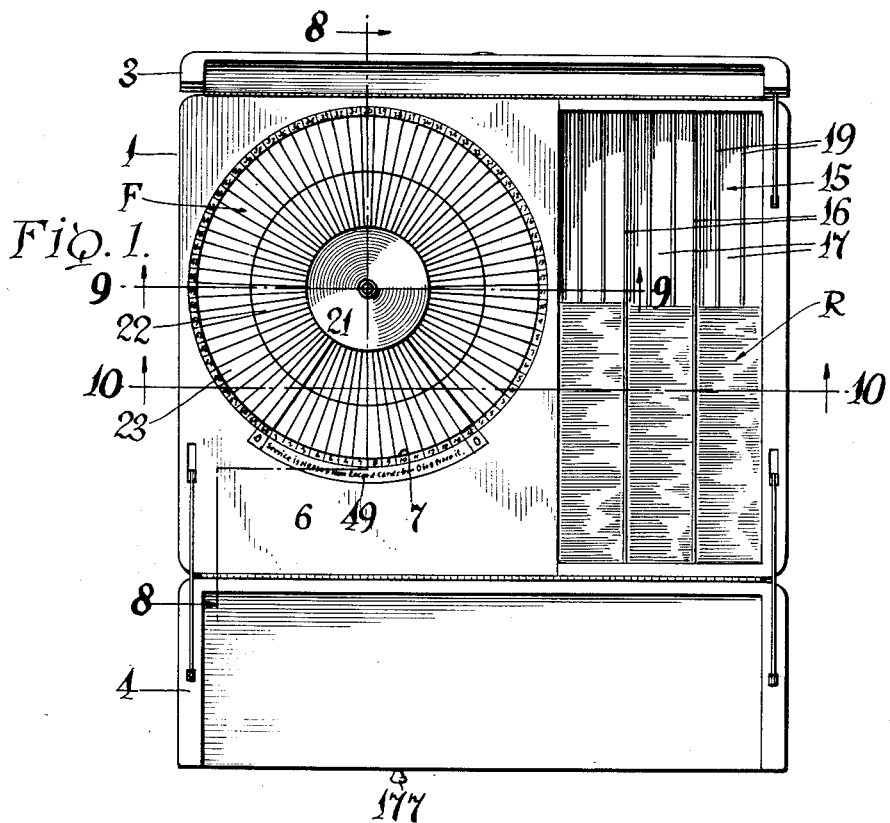
Figure 1 is a top plan view of the cabinet with its cover elements in open position, this figure also showing in top plan the filing machine and certain associated card compartments.
Figure 2:
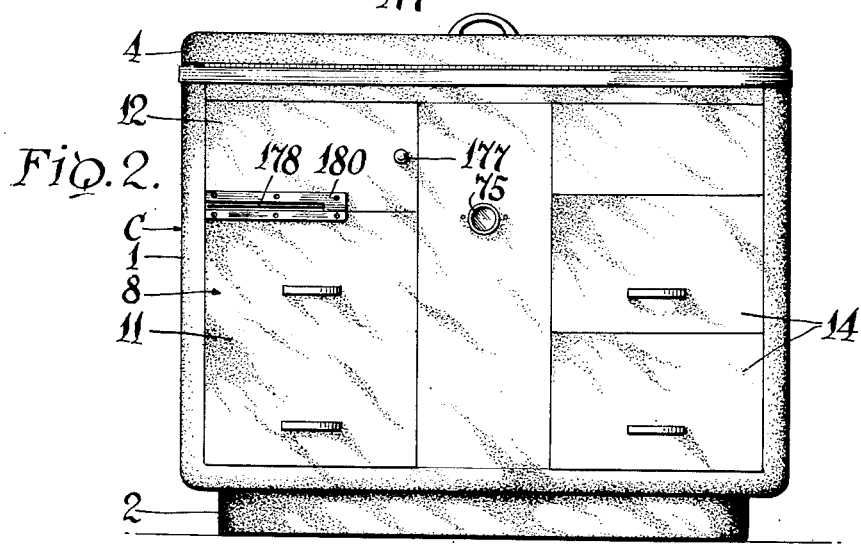
Figure 2 is a front elevation of the cabinet with its cover elements in closed position.
Figure 3:
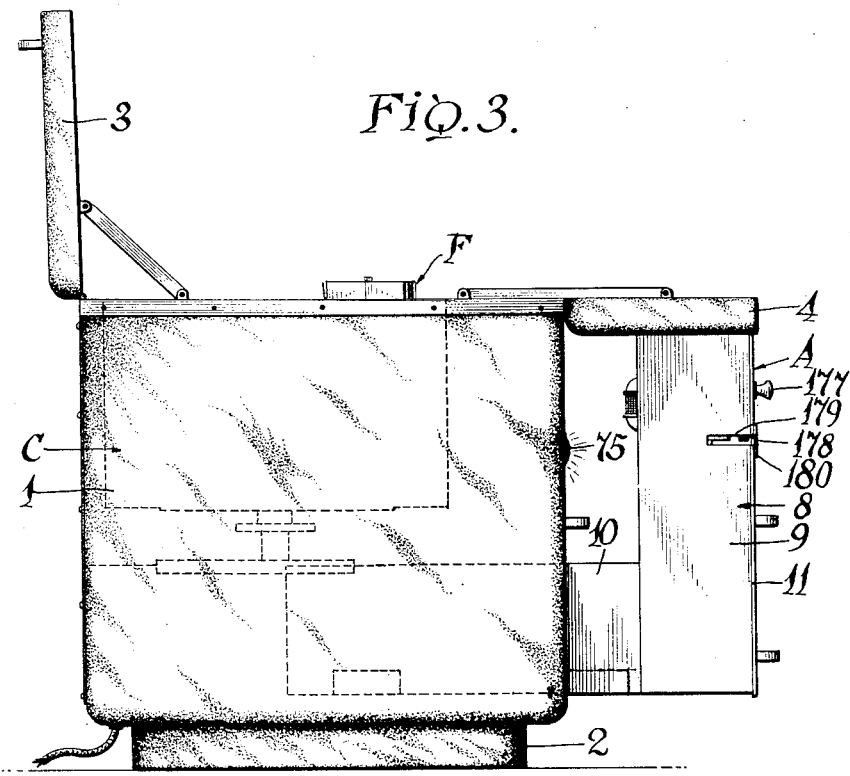
Figure 3 is a side elevation of the cabinet with its cover elements in open position and a drawer element which carries the addressing and stamping mechanism in its outer or open position.

The cabinet includes a rectangular body 1 having side, front and rear walls (the rear wall being omitted from Figure 6 in order to promote clarity of disclosure), a rectangular bottom supporting flange 2, and a cover composed of elements 3 and 4 hinged to the rear and front walls respectively, normally closed as indicated in Figure 2, and having open positions as shown in Figures 1 and 3, the element 4 in open position serving as a desk.

As to the cabinet structure, it will be sufficient to point out that it includes at one side of a median longitudinal plane a plate 5 (Figure 6) which participates in the support of the filing machine F; a top plate 6 which, at the same side of the median plane, has an opening 7 to accommodate the card carrier of the filing machine; a slidably mounted drawer element designated generally as 8 (Figure 3) having L-shaped side walls composed of vertically extending portions 9 and horizontally extending portions 10, and a front wall 11 which includes an upper panel 12 hinged to one of the vertical portions 9; and, at the opposite side of the median plane, supports 13 (Figure 6) for slidably mounted drawers 14 (Figure 2) for holding blank cards, service and record cards, cards of extremely inactive customers, and, if desired, paraphernalia related to the use and operation of the apparatus; and above the drawers 14 a compartment 15 (Figures 1 and 6) divided by longitudinal partitions 16 into wells 17 which are open at the top of the cabinet and which accommodate records cards R (alphabetically arranged as suggested in Figure 9), these being held in upright relation by the usual follower plates 18 mounted for longitudinal sliding movement upon guide rods 19.

Figure 8:
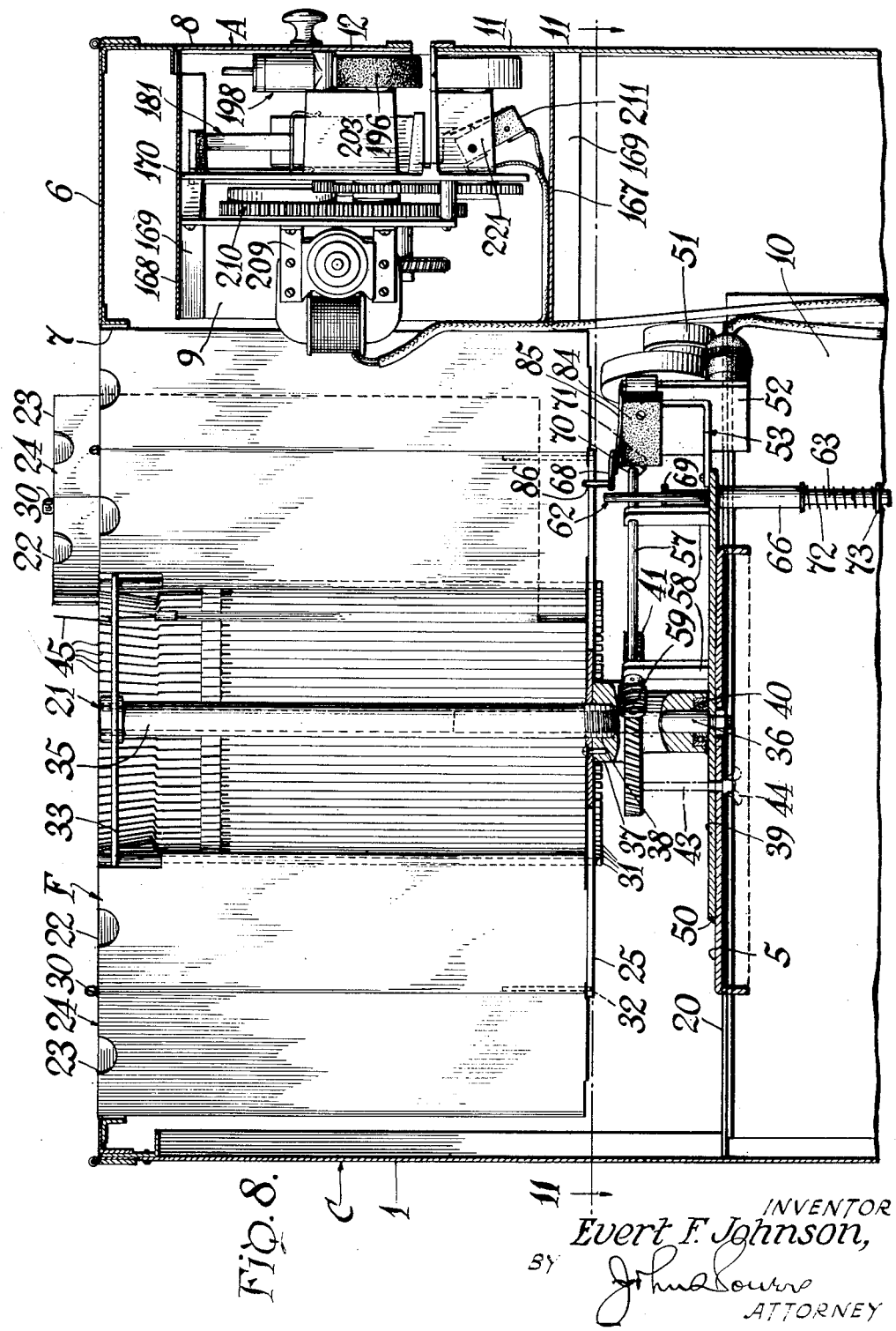
Figure 8 is a partial vertical longitudinal section in the plane 8—8 of Figure 1, looking in the direction of the arrows.

The cabinet also includes spaced parallel vertical plates 20 which are formed to provide supporting guides for the slidably mounted horizontally extending portions 10 of the drawer element 8, the vertically extending portions 9 of the drawer element serving for the support of the mechanism A (Figures 8 and 24).

The filing machine

The filing machine includes a card carrier, designated generally as 21 (Figures 8, 9, 12 and 15), which is movable in an orbital path and is preferably of annular outline and rotatable about a central vertical axis. So formed, the carrier is provided with radially extending card holding pockets and these, in order to provide for maximum capacity and to distinguish between the cards of active and inactive customers, are preferably arranged in inner and outer annular series 22 and 23, respectively, and in the two series are severally in radial alinement, the pockets of each radially alining pair being preferably physically connected to provide a duplex card holding unit 24 (Figures 15 to 19), and each unit being structurally independent of adjacent units. Within reasonable limits of compactness the carrier may include seventy-five units 24 with the outer pockets 23 having a maximum capacity of forty-seven cards and the inner pockets 22 having a maximum capacity of twenty-five cards, the carrier thus having a total maximum capacity of 5400 cards. This is amply sufficient for the average establishment.

The units 24 are supported upon, and movable with, a rotatably mounted horizontal plate 25. For the purpose of effecting the deployment of the service cards S and their restoration to normal positions in the carrier the units are also mounted for vertical movement relative to one another and to the supporting plate 25.

The units 24 may be of any suitable construction. As shown, and preferred for economy of manufacture, each unit is made of a continuous strip of sheet metal bent to form the two radially alining pockets 22 and 23, these having vertical walls and bottom walls and being open at their upper ends. The folding of the strip of metal provides the vertical walls and a separating partition 26. The strip has appropriate severed extensions which are folded at a right angle to the vertical walls and in overlapping relation to provide the bottom walls 27. The adjacent folded parts of the strip, in order to prevent their separation, may be secured by welding or by appropriate clips, the latter being shown. For example, Figure 19 shows a plate 28 which overlies the bottom walls 27 of both pockets and has each end inturned as at 29 about the laminae of the bottom walls to provide securing clips; also clips 30 may be provided at the upper ends of the partitions 26. The supporting plate 25 projects under the bottom walls 27 of the inner pockets 22 and thereby supports the units 24.

In order to prevent displacement of the units 24 relative to the supporting plate 25, as by radial canting or radial or peripheral sliding movements, and also in order to guide the units in their vertical movements, i. e., during deployment and return, the supporting plate 25 carries inner and outer annular series of guide rods 31 and 32, respectively. The guide rods 31 of the inner series also serve as tie rods and hence are vertically co-extensive with the inner pockets 22. The guide rods 32 of the outer series need be only of a length co-extensive with the vertical movement of the units 24. The guide rods 31 and 32 adjoin the end vertical walls of the inner pockets 22 (Figures 15, 16 and 17) and in their guiding function cooperate with these walls. The card carrier includes a top plate 33 (Figures 8 and 15) having openings through which the upper portions of the guide rods 31 project, the guide rods having press fit in such openings and also in openings in the bottom supporting plate 25. The guide rods 32 are rigidly fitted to the supporting plate 25 adjacent its periphery and project through openings 34 in the plates 28.

The top plate 33 is mounted at the upper end of a central tubular shaft 35 (Figure 8) which, in turn, is fitted uopn an upright post 36 projecting above and below the supporting plate 25. The lower end portion of the shaft 35 projects below the supporting plate 25 and is operatively connected to a rotatable hub 37, e. g., as by having threaded engagement in a socket or counterbore 38 in the upper end of the hub, the post 36 projecting through a central axial opening in the hub. The hub 37 is suitably connected, as by a screw, to the plate 25, and is supported upon a relatively fixed plate 39 which, in turn, is mounted upon the plate 5, the post 36 resting upon and being secured to the plate 39. The hub 37 at its lower end is provided with a ball bearing 40 which surrounds the post 36, the inner stationary member of the bearing resting upon the plate 39 and the outer rotatable member of the bearing supporting the hub and the associated card carrier.

The card carrier and associated hub 37 are freely removable as a unit from the machine, for this purpose being vertically liftable. They are, of course, freely replaceable as a unit by lowering them into the working position shown in Figure 8.

The hub 37 carries a worm wheel 41 as a part of the gearing by which the card carrier is rotated. This worm wheel is conveniently, and preferably, utilized as an element of means for preventing axial and rotative displacement of the card carrier during shipment. For this purpose the worm wheel is formed (Figure 11) with a threaded opening 42 for cooperation with the threaded free end portion of a stem 43 (shown in broken lines in Figure 8) which extends through openings in the plates 5 and 39 and has at its lower end a shouldered thumb piece 44 of wing formation which bears against the underface of the plate 5. When the machine is to be put into use the stem 43 is disconnected from the worm wheel 41 and removed.

Figure 9:
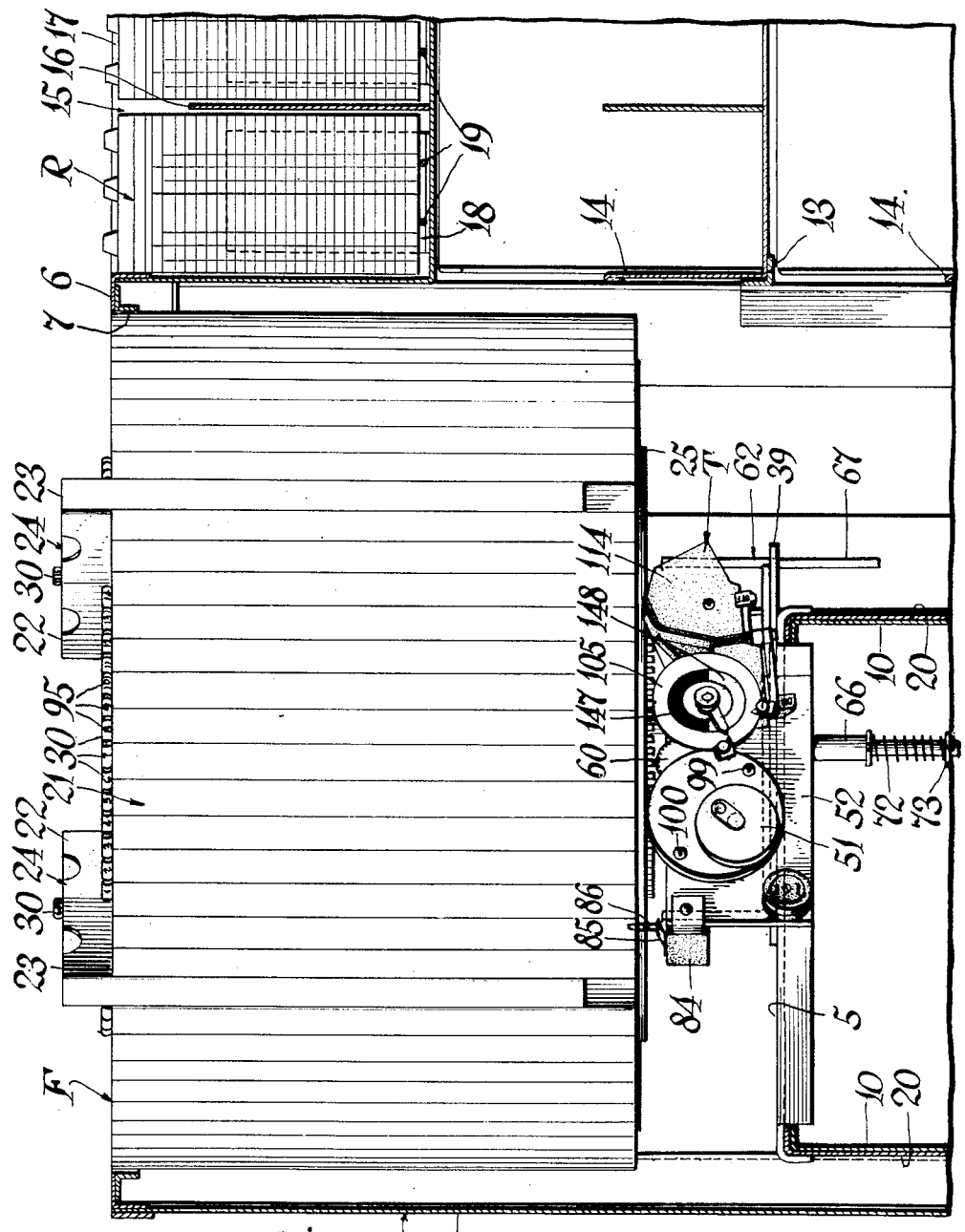
Figure 9 is a partial cross section in the plane 9—9 of Figure 1, looking in the direction of the arrows.
Figure 10:
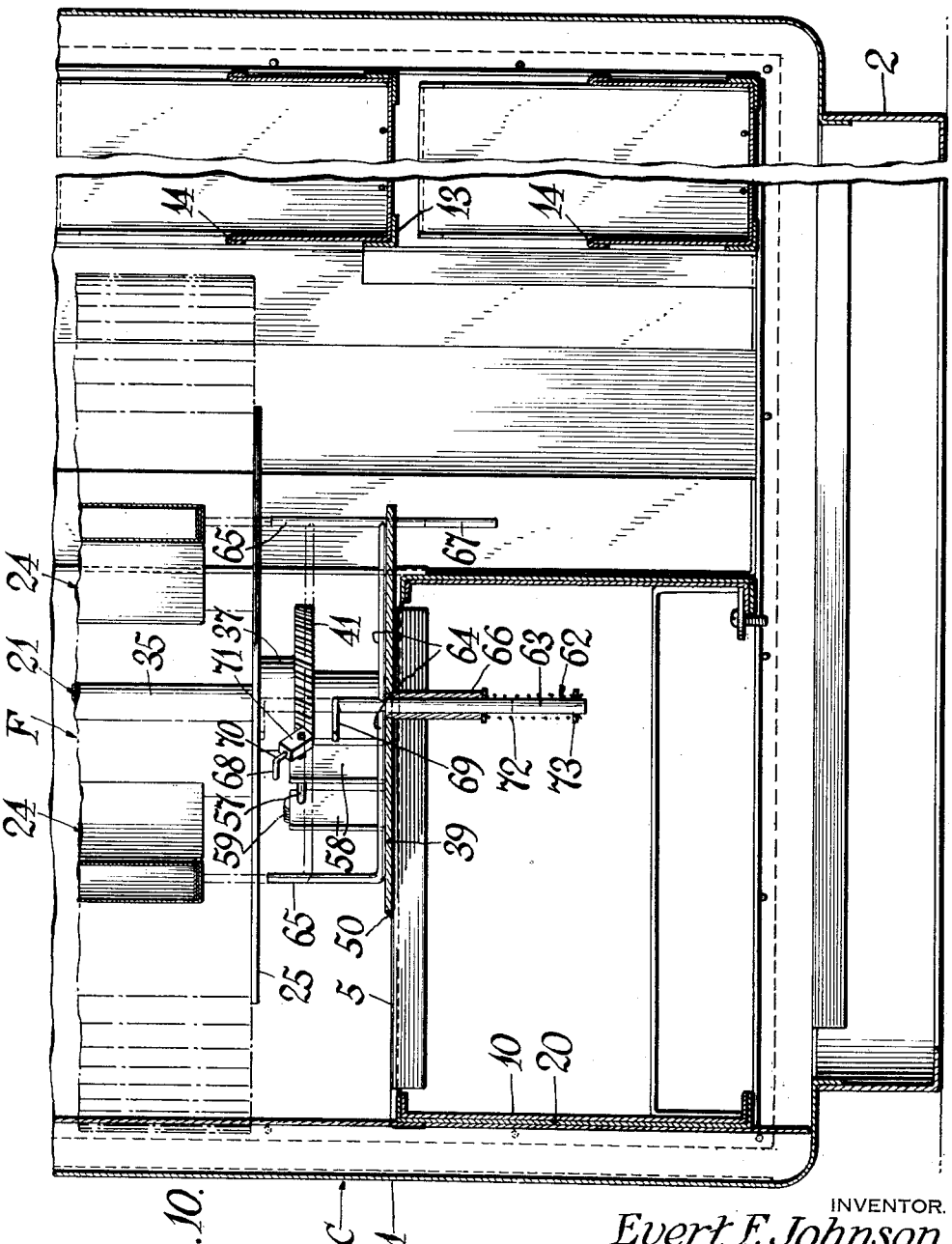
Figure 10 is a partial cross section in the plane 10—10 of Figure 1, looking in the direction of the arrows.

In the operation of the machine certain units 24 will be lifted, i. e. deployed, to an elevation above the remaining units as shown in Figures 8, 9 and 10. The lifted units will be held in elevated position, independently of the lifting mechanism, until such times as they may be restored to initial or normal position by the clerk in charge of the machine. For this purpose the inner vertical wall of each inner pocket 22 is provided with an upwardly projecting spring finger 45 having at an intermediate point a radially offset shoulder 46. The finger 45 may be attached to the pocket 22 in any suitable manner. As shown in Figure 15 the wall of the pocket has a clip 47 struck from it and the lower portion of the finger 45 is inserted through this clip and suitably secured. The openings in the top plate 33 through which the rods 31 project are formed with radial inwardly directed extensions 48 (Figure 16) and the upper portions of the fingers 45 project through these extensions. When the units 24 have been lifted to the required extent the shoulders 46 engage as catches upon the upper surface of the plate 33, thereby to support the units in their elevated positions, independently of the lifting mechanism. In order to release a unit 24 and permit its downward movement to normal position, in which it is supported upon the plate 25, the free end of the corresponding finger 45 is pushed manually toward the pocket 22, thereby to disengage the shoulder 46 from the plate 33 and permit the unit to move downward by gravity.

The card carrier is continuously rotated through an arc substended by a unit 24 every twenty-four hours. Assuming seventy-five units 24, as in the example shown, a complete revolution of the card carrier requires seventy-five days, each of twenty-four hours.

In each seventy-five day period of revolution a certain number of consecutive days, e. g., sixteen, as in the example shown, is set apart as a period for the notification of the customer, if necessary repetitiously to a determined extent. In the orbital path of revolution a fixed zone of a peripheral extent corresponding to the consecutive sixteen day notification period is set apart to provide what may, for convenience, be designated as a "service needed" zone. When a unit 24 enters this zone, and on the first day of the sixteen day period, it is lifted relatively to the adjacent units. When it enters the last day of the service needed zone it is again lifted relatively to the adjacent units. This service needed zone may be, and preferably is, distinguished from the remainder of the orbital path in any suitable manner. For example, and as shown in Figure 12 at 49, it may be suitably marked by delimiting lines upon the cabinet top plate 6 adjacent the periphery of the card carrier, and these lines may enclose any suitable identifying and legendary notations, for example, zeros (0) adjacent the first and sixteenth day of the service needed zone, and between the zeros any appropriate legendary direction such as "Service is needed NOW Record cards from 0 to 0 prove it." The units 24 when lifted within the service needed zone are held by the spring fingers 45 in elevated positions until they are released by the clerk in charge of the machine, all as above explained.

Figure 11:
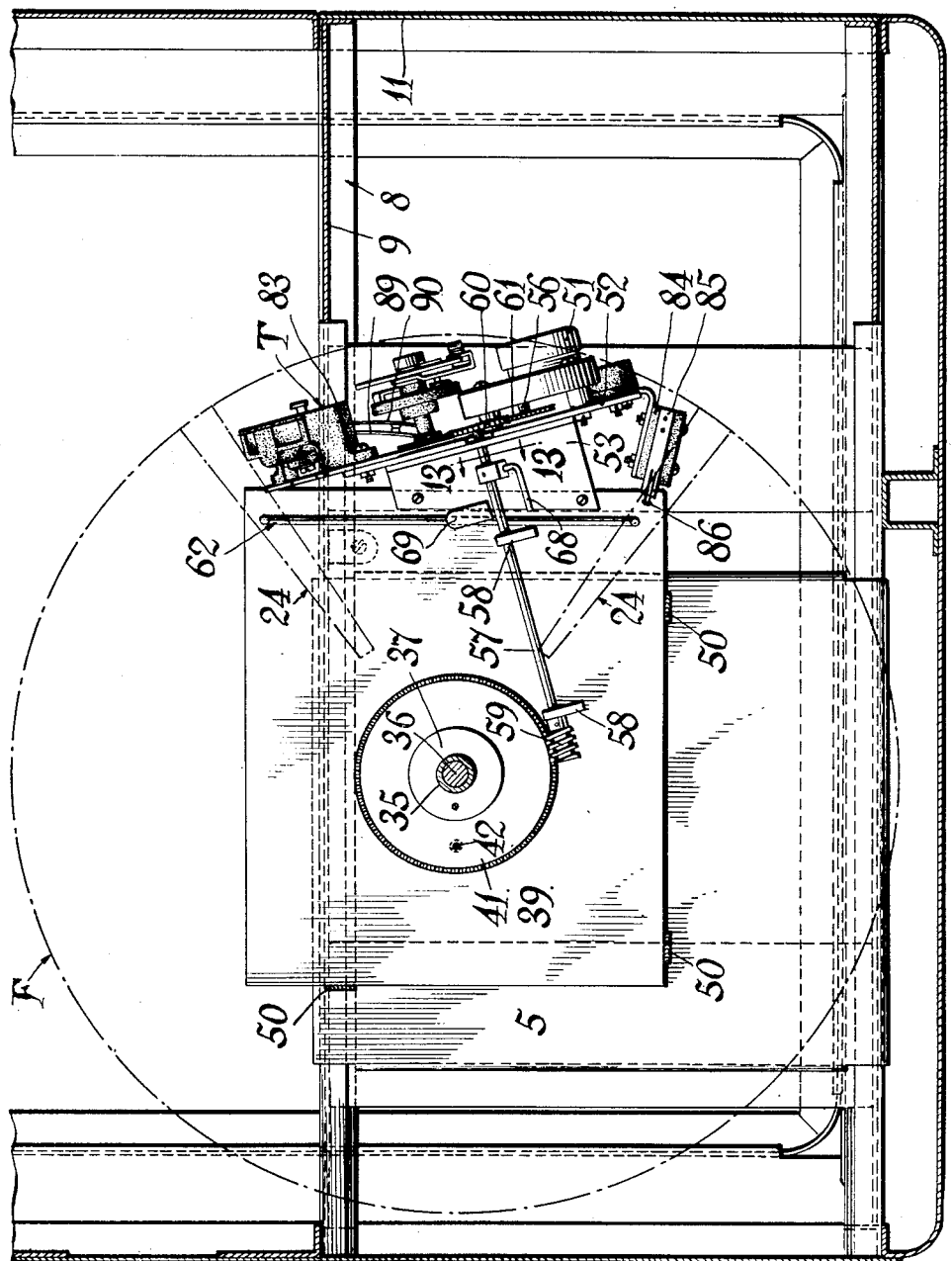
Figure 11 is a partial horizontal section in the plane 11—11 of Figure 8, looking in the direction of the arrows.

The mechanisms for effecting the rotation of the card carrier and the deployment of the units 24 are supported upon the plate 39 which, in turn, is mounted upon the plate 5 and secured to it in any suitable manner, e. g., by welds 50 (Figure 11). These mechanisms are operated by a suitable motor 51 (Figure 11) carried by a vertical plate 52 (which also supports other parts to be later described) secured to an angle bracket 53 (Figures 8, 11 and 21). The bracket 53 has a horizontal arm 54 and a vertical arm 55. The horizontal arm 54 is mounted upon and secured to, and projects beyond, the plate 39; and the plate 52 is secured to the vertical arm 55 adjacent its outer side.

The casing of the motor provides a bearing for a projecting stub shaft 56 (Figures 11, 20 and 21) and encloses suitable reduction gearing (not shown) by means of which the shaft 56 is driven one revolution in every twenty-four hours. The motor 51 and the enclosed reduction gearing for driving the shaft 56 may be of any known suitable construction, various constructions wherein reduction gearing is enclosed within the motor casing for the operation of an output shaft at reduced speed being items of current production by manufacturers of electric motors.

The operative connections for the rotation of the card carrier 21 include a horizontal shaft 57 (Figures 8, 11 and 20) journalled in upright posts 58 carried by the plate 39 and a worm 59 carried by the shaft 57 and meshing with the worm wheel 41, these elements constituting reduction gearing. The shaft 57 projects through openings in the vertical arm 55 of the bracket 53 and in the plate 52 and at its outer end carries a pinion 60 in mesh with a pinion 61 mounted on the stub shaft 56. Thereby the card carrier 21 is continuously rotated, one revolution requiring seventy-five days, and moves through one-seventy-fifth of the cyclical path every twenty-four hours.

The mechanism for lifting the units 24 includes a lifting fork 62 (Figures 8, 9, 10, 11, 13, 14, 20 and 21) which consists of a central stem 63 carrying oppositely projecting arms 64 and vertical posts 65 projecting upward from the outer ends of the arms 64. The plate 39 has an opening for the stem 63 and carries a downwardly projecting guide sleeve 66 for the stem 63. A second guide for the lifting fork 62 is provided by a stem 67 depending from one of the arms 64 (Figure 20) and movable through an opening in the plate 39. The guide stem 67 prevents the lifting fork from turning about the central stem 63 as an axis.

The lifting fork 62 normally occupies a lower position with its vertical posts 65 terminating closely adjacent the bottoms 27 of the vertically alining units 24. The distance between the posts 65 is commensurate with the "service needed" zone above explained and the location of the posts 65 is coincident with the location of the two units 24 at the respective ends of the zone. Thereby when the fork 62 is raised its posts 65 will lift the respective vertically alining units 24.

The operation of the lifting fork involves its movement from a normal lower position to an elevated position, its retention in the elevated position, and its return movement. From a practical standpoint it is preferable that the operation of the lifting fork be completed during non-working hours, e. g., between 7 p. m. and 4 a. m.; and from the standpoint of simplicity of manufacture it is preferable that the lifting fork be operated from the shaft 57 employed to effect the rotation of the card carrier 21.

The lifting fork is raised by a horizontal arm 68 (Figures 13 and 14) carried by the shaft 57 and thereby movable through a circular path. The arm 68 at periods of its movement successively engages and disengages a lateral projection 69 at the upper end of the stem 63. The arm 68 is formed as an angular extension of a stem 70 which projects radially from a block 71 mounted upon and secured to the shaft 57. The circular movement of the arm 68 as viewed in the planes of Figures 13 and 14 is counter-clockwise. At a period of such movement the arm 68 engages under the projection 69 (Figure 13) and thereupon initiates the upward movement of the lifting fork 62, the extent of such upward movement being indicated by broken lines in Figure 10. The fully elevated position of the lifting fork is shown in Figure 14. At such time the arm 68 passes from engagement with the projection 69, thereby permitting the lifting fork to move downward to its normal position. The return movement of the lifting fork may be accomplished by gravity but it is preferred to force the lifting fork to its lower position by a spring 72 (Figures 8, 9 and 10) mounted upon the lower portion of the stem 63 and reacting against the lower end of sleeve 66 and a collar 73 mounted upon the stem 63 at its lower end.

It is preferred that an appropriate signal be displayed for a suitable period after the commencement of working hours in order to indicate that the units 24 holding the cards which require attention during the particular working day have been elevated, thereby to enable certain and convenient selection of such cards and their removal from the machine for the purpose of use.

The signal consists of an electric lamp 74 (Figures 4 and 6) mounted within the cabinet and employed in connection with a lens 75 which is suitably colored, e. g., red, the lens 75 being fitted in the front wall of the cabinet (Figures 2 and 3).

Figure 4:
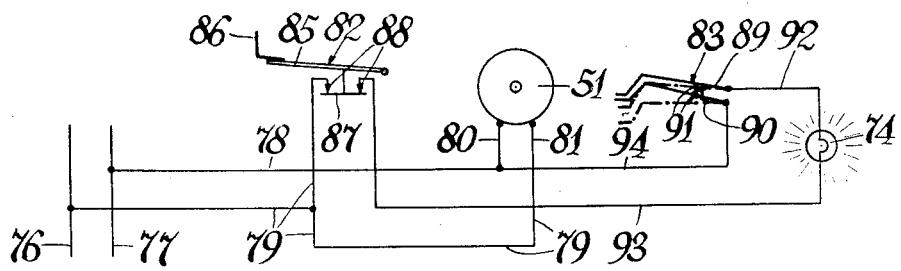
Figure 4 is a diagram showing the circuit for the operation of a signal device indicative of the fact that deployed service cards are awaiting attention.

Figure 4 is a diagram of the circuit for the operation of the lamp 74 and also of the circuit for the operation of the motor 51. The power lines are shown at 76 and 77 and the lines leading from the power lines at 78 and 79. The connections to the motor 51 are shown at 80 and 81, the wire 80 being connected to the line 78 and the wire 81 being connected to the line 79. Thus starting with the line 76 the motor circuit includes the line 78, wire 81, motor features, wire 80, lines 78 and 77. With the lines 78 and 79 plugged into the lines 77 and 76 the motor 51 will operate continuously.

The circuit of the lamp 74 includes two switches 82 and 83, the switch 82 being preferably of standard micro type. The switch 82 is a conditioning switch and switch 83 is a closing switch. If either switch be open the circuit is open and the lamp is inoperative.

The operation of the switch 82 is controlled by one of the two units 24 which are raised by the lifting fork. For this purpose the casing 84 of the switch 82 (Figures 8, 9 and 11) carries at its upper side a spring finger 85 having an angularly projecting terminal extension 86 which normally bears upon the bottom of the unit 24 by which the operation of the switch is controlled. The finger 85 is operatively connected to the spring pressed movable contact element 87 (Figure 4) mounted within the casing 84. The controlling unit 24 in its lower normal position holds the switch 82 normally open. The finger 85 follows the upward movement of the unit 24 against the bottom of which its extension 86 bears. As this unit is raised the spring finger 85 moves upward as shown in broken lines in Figure 20. At the completion of its upward movement, as shown in Figure 4, it effects the engagement of the movable contact 87 with the stationary contacts 88 and thereby conditions the lamp circuit for operation when the switch 83 is closed. Figures 4, 8, 9 and 11 show the finger 85 in its upper switch-closing position. In Figure 20 the finger 85 is shown in solid lines in its normal switch-opening position and in its normal association with the vertically alining unit 24; and is shown in broken lines in its raised switch-closing position, the vertically alining unit 24 being shown by broken lines at a period of its movement to its elevated position.

In the automatic operation of the machine the switch 83 is closed during the closure of the switch 82 and the lamp circuit remains closed until either of the switches 82 or 83 is opened. When the unit 24 which controls the switch 82 is released by manipulation of its spring finger 45, as above explained, the unit moves back to its normal lower position and in its movement depresses the spring finger 85, thereby causing the opening of the switch 82. It will thus be seen that the closure of the switch 82 is effected automatically at a definite (and predetermined) time and that its opening is initiated by a manual operation which involves the release of the controlling unit 24, the time of the opening of the switch 82 depending, of course, on when the manual operation is effected.

The closing switch 83 (Figure 4) includes relatively movable leaf springs 89 and 90 provided with cooperating contact elements 91. The leaf spring 89 is connected by a wire 92 to the lamp 74, the circuit through the lamp being continued by a wire 93 connected to a stationary contact 88 of the switch 82. The leaf spring 90 is connected by a wire 94 to the line 78. Assuming, as shown in Figure 4, that both of the switches 82 and 83 are closed the lamp circuit is as follows: Starting with the line 78 through the wire 94, switch 83, wire 92, lamp 74, wire 93, switch 82 and line 79. The leaf springs 89 and 90 tend to move apart and thereby to open the circuit of the lamp 74, maintaining this relation through the greater part of a twenty-four hour period; but during a fractional part of this period, e. g. for three hours, the leaf springs 89 and 90 are positively actuated to move relatively toward one another, thereby to engage the contacts 91 and close the lamp circuit. The specific times at which the contacts 91 are engaged and disengaged are controlled by time clock mechanism to be later described.

Each unit 24 has a distinguishing and identifying number. With seventy-five units 24 as in the embodiment disclosed, the identifying numbers, which may be conveniently referred to as "pocket numbers" will, of course, run from "1" to "75." The pocket numbers are conveniently applied to the both faces of the clips 30 and are shown at 95 in Figures 9 and 12.

The card carrier 21 is movable relatively to a day scale having sections 96 and 97 (Figures 1 and 12) which are provided on the cabinet top plate 6 in concentric relation to the card carrier and preferably adjacent the edge of the opening 7, the sections being marked off into day divisions, consecutively numbered for day identification purposes, each day division having an extent corresponding to the movement of the card carrier through a twenty-four hour period, i. e., one seventy-fifth of its complete cycle.

The numerals of the day scale section 96 run consecutively in counter-clockwise direction from "1" to "60" and the numerals of the day scale section 97 run consecutively in counter-clockwise direction from "1" to "15," the numeral "1" of the scale 97 being adjacent the numeral "60" of the scale 96. The day scale section 97 is arranged within the lines 49 indicative of the "service needed" zone and the last numbered division "60" of the day scale section 96 is also arranged within the service needed zone.

The rotation of the card carrier is in clockwise direction whereby each unit 24 will first move into a position of adjacency to the numerical division "15" of the scale 97 and in such position will be lifted or deployed as shown in Figure 12. The service cards in the pockets of the particular unit 24 thus lifted, for example the unit bearing identification number "11," will be removed and consulted by the clerk to enable the appropriate notifications to be sent to the customers, whereupon the service cards will be replaced in the pockets of the unit "11." The unit "11" is then returned by the clerk, in the manner above described, to its normal lower position and after a period of fifteen consecutive days will move into adjacency to the numbered division "60" of the day scale 96 and in such position will again be lifted or deployed, the second lifting or deployment of a unit being also shown in Figure 12. The service cards in the unit "11" as lifted the second time are again consulted by the clerk and second appropriate notifications are sent to customers who may not have responded to the first notifications. Third notifications should be sent within a shorter period of time, i. e., within a ten day period to customers who may not have responded to the first two notifications. For this purpose the service cards which are used in the second lifting or deployment of a unit 24, e. g., the unit "11," are not returned to the pockets of that unit but are placed in a pocket (or pockets) of the unit 24 which is in a position of adjacency to the numerical division "10" of the scale 97, the number "10" of the scale being indicative of the fact that at the end of ten days the service cards previously consulted will again reach the numerical division "60" of the scale 96 and at that time will again be lifted or deployed to enable third appropriate notifications to be sent. In like manner fourth notifications may, and should, be sent within a still shorter period of time to customers who may not have responded to the previous notifications. Thus when the service cards are consulted on their third lifting or deployment the clerk places them in the pockets of the unit 24 which is in a position of adjacency to the numerical division "5" of the scale 97, the number "5" of the scale being indicative of the fact that at the end of five days the service cards previously consulted will again reach the numerical division "60" of the scale 96 and at that time will again be lifted or deployed to enable fourth appropriate notifications to be sent. It will thus be seen that the machine provides for systematized and intensive customer notifications ("follow-ups" in any number and at such intervals as may be desired) during the period when particular services may be needed or required.

The outer annular series of pockets 23 carry the service cards of "active" customers, that is to say those customers who are actively interested in the proper upkeep of their automobiles, who desire the proper services when they are needed or required, and who respond with reasonable promptness to original or follow-up notifications. The annular series of inner pockets 22 may, if their capacity be needed, carry the cards of "active" customers but are especially reserved for the cards of "inactive" customers, i. e. customers who are sporadic in taking care of the services which their automobiles may require and who have not been reasonably responsive to previous notifications and "follow-ups." Within the "service needed" zone delimited by the lines 49 the pockets of both series carry the service cards of customers who are to be notified in the manner above described, i. e. by original notification and, if necessary, "follow-ups"; the cards of the active customers may be placed in the pockets of either or both series; the cards of the inactive customers who, for a second time, are to have the benefits of intensive notification, are kept in the inner pockets 22 within the "service needed" zone.

When a customer responds to a notification or "follow-up" and his car is given the service or services required, his card is placed in a pocket of the appropriate unit 24, that is to say, the unit having at the time a suitable location with reference to the day scale 96. If the outer pocket 23 of this unit is too full, the card may be placed in the inner pocket along with the cards of "inactive" customers. The determination of the particular unit in which the card of the customer who has received service is placed is discretionary, according to circumstances, for example, the particular service which the customer will next require, consideration of his driving habits, and consideration of the quality of the material used in the particular service given. Thus customer John Doe, as is known to the proprietor, drives his automobile 1000 miles in thirty days and customer Richard Roe drives his automobile 1000 miles in sixty days. Assuming that for both of these customers the next service needed is a change of lubricating oil and both use oil good for 1000 miles of driving, John Doe's service card will be so located in the carrier as to be lifted or deployed at the end of thirty days and Richard Roe's service card will be so located as to be lifted or deployed at the end of sixty days. As a further example customer Henry Hoe prefers the best grade of lubricating oil derived from Pennsylvania grade crude which is ordinarily good for 1000 miles of driving and customer Charles Coe prefers a lubricating oil having a bituminous or asphaltic base or a paraffin base from a field not within the Appalachian Strip, which may be good, let us say, for five hundred miles of driving; Henry Hoe and Charles Coe both drive 1000 miles per month but since Henry Hoe uses lubricating oil which is good for 1000 miles he will require notification only in thirty days whereas Charles Coe who uses lubricating oil good for only five hundred miles will require notification in fifteen days.

In the examples suggested Richard Roe and Henry Hoe will need a change of lubricating oil within sixty days. Therefore, after their cars have had changes of lubricating oil their cards are placed in a pocket of the unit 24 which adjoins the division of the day scale 96 identified by the numeral "60," this numeral being indicative of the fact that at the end of sixty days these service cards will reach the numerical division "15" of the scale 97 and at that time will be raised or deployed to enable notifications to be sent, following which the sequence of intensive "follow-ups" may be carried out to such extent as may be necessary. In like manner John Doe's service card will be placed in a pocket of the unit 24 which adjoins the division of the day scale 96 identified by the numeral "30" and Charles Coe's service card will be placed in a pocket of the unit 24 which adjoins the division of the day scale 96 identified by the numeral "15" whereby, in the manner above explained, John Doe will be notified at the end of thirty days and Charles Coe will be notified at the end of fifteen days. Other variations of times for customer notification will obviously depend on the particular service needed, e. g., battery service, lubrication grease, transmission grease, motor tune-up, etc.

As above explained, when a customer has failed to respond to the first series of notifications, viz., original and "follow-ups," his card is placed in the pockets, i. e., the inner pockets 22, reserved for inactive customers. Generally speaking his card will be placed in inner pockets 22 of the unit which at that time adjoins the last division "60" of the day scale 96 whereby at the end of sixty days his card will enter the service needed zone where it is again raised or deployed to enable a second series of notifications, original, and such follow-ups as may be necessary, to be given, all in the manner above described. If the customer fails within a reasonable time to respond to the last follow-up notification of the second series, his card may be transferred to the file reserved for extremely inactive customers, i. e., one of the drawers 14, where it need be referred to only in the event of an unexpected call from the customer or in connection with such routine mailings as Christmas and New Year's greeting cards or seasonal reminders such as winter and summer grade lubricating oil changes, necessity for anti-freeze solutions, radiator flushing and the like.

The period of time required for the movement of the carrier and for the upward movement of the lifting fork is provided for by suitable reduction gearing operated from the stub shaft 56 of the motor 51, this reduction gearing consisting of the pinion 61, the pinion 60, the shaft 57, the worm 59 and the worm wheel 41, all as above explained. The shaft 57 makes a complete revolution each twenty-four hours and the movement of the lifting fork from its lower to its fully elevated position as effected by the arm 68 and cooperating projection 69 requires a period of nine hours. The ratio of the worm 59 to the worm wheel 41 is 75 to 1 whereby, as above explained, a complete revolution of the card carrier requires seventy-five days.

The contact elements 91 of the closing switch 83 for the lamp circuit are maintained in engagement for a definite and determined number of hours and the instrumentality provided for their engagement or disengagement is operated in definitely timed relation from the stub shaft 56 of the motor 51 by means of a pinion 98 (Figures 11, 20 and 21) in mesh with the pinion 60 which drives the shaft 57.

The pinions 61, 60 and 98 may be regarded as elements of the time clock mechanism T (Figures 11 and 20 to 23). In order that (1) the period at which the operation of the lifting fork commences may be varied to suit the requirements or practices of the particular establishment in which the apparatus is used, (2) the duration of the period in which the lamp circuit is closed and the specific times of the opening and closing of the lamp circuit may be varied for similar reasons, and (3) correction of the relation of the parts may be readily made in the event of the discontinuance of the operations of the motor 51 as by a failure of power or for any other cause, the mechanism T includes a number of parts to be explained in sufficient detail. Time clock mechanisms having features which will serve the above stated purposes are well known articles of manufacture, the construction shown being merely illustrative and no novelty being claimed for it per se. However the mechanism T, independently of its details, is combined in a novel and advantageous manner with various elements of the machine and these features of combination are believed to be of inventive quality.

The casing of the motor 51 is mounted upon the plate 52, secured, as above explained, to the vertical arm 55 of the angle bracket 53. The motor casing is secured to the plate 52 by two bolt fastenings 99 and 100 (Figures 20 and 21). The bolt element of the fastening 100 projects through a curved slot 101 in the plate 52 and when the elements of the fastening 100 are loosened the motor casing may be turned about the bolt element of the fastening 99 as a pivot, thereby to disengage the pinion 61 from the pinion 60 and to move the pinion 61 back into engagement with the pinion 60, these movements of the motor casing about the fastening 99 being provided for in connection with that adjustment of the mechanism which enables a change of the hour (or fraction) at which the operation of the lifting fork is commenced and also enables a correction in the event of the discontinuance of the operation of the motor 51.

The special elements of the time clock mechanism, provided for the purposes above described, are supported by a plate 102 which is secured by suitable fastenings, e. g., screws or bolts, to the plate 52 at one side of the casing of the motor 51, the plate 102 enabling the removal and replacement of these elements as a unitary assembly.

The plate 102 carries a fixed, i. e., non-rotatable, arbor 103 which is provided at its outer end with a fixed radially projecting pointer 104 overlying the calibrated face of a circular dial plate 105. The pinion 98 is mounted at the inner end of a sleeve 106 which is rotatably mounted upon the arbor 103 as a journal. The sleeve 106 in turn provides a journal for a cam plate 107 of insulating material, the hub 108 of the plate 107 having a rotatable non-slidable mounting upon the sleeve. The dial plate 105 is mounted fast upon the sleeve 106 at its outer end, the dial plate thereby being rotated by the sleeve. The leaf spring elements 89 and 90 of the switch 83 are provided at their free ends with adjacent angular extensions 109 and 110, respectively. The plate 107 is provided on its inner vertical face with adjacent inner and outer lugs, 111 and 112 respectively, each having a cam face 113, these lugs being for cooperation as cams with the extensions 109 and 110.

The leaf spring elements 89 and 90 of the switch 83 are carried by and project beyond a block 114 of insulating material which is attached by screw or bolt fastenings 115 to the plate 102. The block 114 on its outer face carries electrical conductor elements 116 and 117 mutually insulated by a mid-web 118 of the block and secured to the block by binding posts 119 and 120, respectively, to which the respective wires 92 and 94 are connected. The leaf spring elements 89 and 90 at their inner ends are at once secured to the block 114 and electrically connected to the respective electrical conductor elements 116 and 117 by screws 121 and 122.

The dial plate 105 and the pointer 104 are held against outward thrust by a collar 123 fixed upon the outer end of the arbor. Two radially extending arms 124 and 125 (Figure 23) are provided for cooperation with the dial plate 105. These arms regulate the closing and opening of the circuit of the lamp 74. Their specific angular relation, i. e., mutual spacing, determines the period during which the circuit of the lamp 74 is closed. Their positions relatively to the dial plate determine the specific times at which the circuit of the lamp 74 is closed and opened. The arms 124 and 125 are pivotally mounted on the sleeve 106 between the dial plate and the outer end of the hub 108. Each arm terminates at its free end in a clip member 126 U-shaped in cross section, the outer leg of which overlies the dial plate 105 and is provided with a pointer 127 for cooperation with the markings on the dial plate. The clip members 126 are normally connected to the dial plate 105 in order that the arms 124 and 125 may be moved about their pivotal center (the sleeve 106) by the dial plate in the course of its normal rotation or of its rotative adjustment. In order that the arms 124 and 125 may be positionally adjustable relatively to one another and to the dial plate 105 provision is made for disconnecting the arms from the dial plate. For the purposes of the connection and disconnection of the arms 124 and 125 relatively to the dial plate clamping screws 128 (Figure 22) are threaded through the outer legs of the clip members 126 and between the legs of the clip members carry clamping plates 129, the screws being threaded through openings in the clamping plates. It will be obvious that when the screws 128 are turned in one direction, i. e. tightened, the outer legs of the clip members and the clamping plates 129 will have clamping engagement with the dial plate 105 whereby the dial plate and the arms 124 and 125 are movable together, as above explained; and that when the screws 128 are backed off the clamping pressure of the plates 129 upon the dial plate will be relieved whereby the arms 124 and 125 may be freely adjusted about their pivotal center with reference to one another and to the dial plate.

The arm 124 is provided with an inwardly projecting finger 130 which has a close fit in a recess in a lug 131 on the outer face of the cam plate 107. Thereby the cam plate 107 participates in the movements of the arm 124. When the arm 124 is clamped to the dial plate 105 it causes the rotation of the cam plate by the dial plate. In other words the dial plate, the arm 124 and the cam plate are rotatable as a unit, the dial plate being the driving element.

The leaf spring elements 89 and 90 of the switch 83 have normal inner positions (shown schematically in dot and dash lines in Figure 4) in which the contacts 91 are disengaged and the circuit of the lamp 74 is open. They also have outer positions to which they are moved by the cam lugs 111 and 112 and in which the contacts 91 are engaged and the circuit of the lamp 74 is closed. The outer circuit closing positions of the leaf spring elements 89 and 90 are shown in full lines in Figures 4 and 22. The movement of the finger 89 by the cam lug 111 tensions it and the movement of the finger 90 by the cam lug 112 brings the finger 90 into position whereby when the finger 89 is disengaged by the cam lug 111 and snaps back toward the finger 90 the contacts 91 will be brought into engagement as shown in Figures 4 and 22.

The inner finger 90 is provided with a lateral extension 132 (Figures 21 and 23) which is bifurcated, that is to say provided with an edge recess 133 to receive the laterally projecting arm of a spring pressed horizontal bell crank lever 134 pivotally mounted upon the plate 102. The function of the lever 134 is to latch the fingers 89 and 90 in circuit closing position and for this purpose the laterally projecting arm of the lever 134 is provided with a tooth 135 which engages the shoulder provided by the end wall of the recess 133, this shoulder riding over the tooth 135 during the movement of the fingers to circuit closing position and the lever arm snapping into latching position when the shoulder passes beyond the tooth.

The arm 125 is provided with an extension 136 which terminates in an angular projecting finger 137. At a period of the movement of the arm 125 with the dial plate 105 the finger 137 engages the end of the laterally projecting arm of the bell crank lever 134 and moves it to disengage the tooth 135 from the extension 132 of the finger 90, thereby to release the fingers 90 and 89 and permit them to snap back to their normal positions (as shown in broken lines in Figure 4) wherein the spring contacts 91 are disengaged and the lamp circuit is broken. As the movement of the arm 125 continues the finger 137 passes beyond the end of the lateral arm of the bell crank lever 134 and releases it whereupon the lever 134, being spring pressed, returns to its normal position wherein the tooth 135 can again engage the shoulder provided by the recess 133 at the next period or at the next specific time determined upon for the engagement of the contacts 91, all as above described. The time in which the finger 137 effects the release of the spring fingers 90 and 89 from their circuit closing position depends, of course, upon the setting of the arm 125 relatively to the dial plate 105.

In addition to the automatic control of the lamp circuit it is preferred to provide a manual control which may be used whenever, for any particular reason, it may be desired that the circuit, as to period and specific times of opening and closing, be controlled independently of the automatic controlling features.

For the circuit closing operation the manual control includes a horizontal lever 138 pivotally mounted upon an arbor 139 arranged below the block 114 and fitted in a lug projecting outward from the plate 102, the lever 138 being spring-held in an outer non-functioning position. The lever 138 has on its upper side a projection 140 in horizontal alinement with the extension 132 of the spring element 90. The projection 140 cooperates with the extension 132 and with the latch tooth 135 on the laterally projecting arm of the bell crank lever 134. At any time that it may be desired to close the circuit of the lamp 74 independently of the automatic control features, the lever 138 is pressed inward manually whereby its projection 140 engages the extension 132 to move the leaf spring elements 90 and 89 from their normal position (dot and dash lines of Figure 4) to circuit closing position as above described. In this movement of the lever 138 the outer vertical edge of the projection 140 rides over the tooth 135 on the laterally projecting arm of the bell crank lever 134. When the projection 140 passes beyond the tooth 135 the bell crank lever snaps back to its original position and the tooth 135 engages the projection 140 as a latch, thereby to hold the lever 138 in its inner or depressed position and to hold the leaf spring elements 90 and 89 in circuit closing position in the same way in which it exercised the same function when in engagement with the shoulder provided by the recess 133 of the extension 132.

For the circuit opening operation the manual control includes a horizontal lever 141 pivotally mounted upon the arbor 139 and spring-held in an outer non-functioning position. The lever 141 is provided beyond its pivot with an arm 142 having an angular extension 143 in right angular relation. The arm 142 is provided with a terminal finger 144 (Figure 20) which projects through an opening 145 at the end of the longitudinal arm of the bell crank lever 134. The extension 143 projects through an opening in the plate 102 and is provided with a terminal finger 146 which serves as a stop to limit the inward movement of the lever 141, in this function engaging the inner face of the plate 102.

When the lever 138 is depressed to move the leaf spring elements 90 and 89 to circuit closing position, it is so held, and the leaf spring elements are thereby maintained in circuit closing position, until the bell crank lever 134 is moved into releasing position in which its tooth 135 disengages the projection 140, thereby to permit the return of the spring elements 90 and 89 to normal open position and the return of the lever 138 to normal non-functioning position. This movement of the bell crank lever may be accomplished either by the finger 137 of the arm 125 in the course of the movement of the arm with the dial plate 105 or by the lever 141. When the lever 141 is depressed its finger 144, cooperating with the longitudinal arm of the bell crank lever 134, moves the bell crank lever 134 to releasing position, thereby to release the spring elements 90 and 89 and the lever 138. When the finger pressure upon the lever 141 is released, the lever, being spring-held, returns to normal non-functioning position.

The dial plate 105 (Figures 9 and 20), which moves through one revolution every twenty-four hours, has on its face a section 147 of semi-circular extent and of dark color or shade which conforms to the usual non-working hours of the establishments in which the machine is used, e. g., 6 p. m. to 6 a. m. and a complementary section 148 of semi-circular extent and of light color or shade which conforms to the usual working hours of such establishments, e. g., 6 a. m. to 6 p. m. The sections 147 and 148 bear numerals indicative of the several hours in a twenty-four hour period in accordance with standard clock time. Adjacent its perimeter the dial plate is preferably marked by radial lines into hour divisions and quarter divisions of each hour division, the provision of the sections 147 and 148 and of the hour and quarter-hour markings being in accordance with the usual practice in connection with standard time clock control mechanisms. In addition to the sections 147 and 148 the face of the dial plate may also have diametrically opposite "a. m." and "p. m." markings, as shown in Figure 20, to provide convenient indication of the "a. m." and "p. m." portions of the sections 147 and 148.

In the construction shown the period of time required for the movement of the lifting fork 62 from its lower to its fully raised position is fixed, e. g., nine hours, in accordance with the specific mechanical design of the machine. However the time at which the lifting fork begins to move upward can be changed at will and the adjustments for this purpose can be made at any time that may be convenient.

In Figures 13 and 14 it is assumed that the mechanism has been set for the operation of the lifting fork to commence at 7 p. m. and to be completed at 4 a. m. In this case at 7 p. m., standard clock time, the pointer 104 (Figure 13) will be in radial alinement with the hour indicating numeral "7" of the dial plate section 147; the arm 68 will be under the projection 69 in position to initiate the upward movement of the lifting fork; at 4 a m. (Figure 14) the pointer 104 will be in radial alinement with the hour indicating numeral "4" of the dial plate section 147; and the arm 68 will have just passed from under the projection 69, thereby to release the lifting fork and permit its return to its normal position.

Let it be assumed that it is desired to change the hours during which the operation of the lifting fork is effected, for example, to a period from 8 p. m. to 5 a. m. To make this change: (1) The plate 102 which carries the special elements of the time clock mechanism is, as a matter of convenience, detached from the plate 52; (2) the dial plate is thereupon shifted in clockwise direction until the hour indicating numeral "8" of its section 147 is in radial alinement with the pointer 104 (which remains stationary during the movement of the dial plate); (3) the fastening 100 (Figure 20) of the casing of the motor 51 is loosened and the motor casing is shifted, as permitted by the slot 101, to a position in which the gears 61 and 60 are disengaged, the motor circuit lines 78, 79, etc. being preferably disconnected from the power lines 76 and 77; (4) the shaft 57 is rotated manually to move the arm 68 under the projection 69, i. e., to the position at which it initiates the upward movement of the lifting fork, as shown in Figure 13, the card carrier 21 of course being correspondingly moved; (5) the plate 102 is reattached to the plate 52, restoring the engagement of the pinions 98 and 60; (6) the dial plate 105 by continued rotation in clockwise direction is moved to a position corresponding to standard clock time, that is to say, to a position in which the pointer 104 is alined with the markings on the dial plate which correspond to the standard clock time at which the adjustment is completed, the pinions 98 and 60 effecting corresponding movements of the shaft 57, arm 68, lifting fork 62 and card carrier 21; (7) the casing of the motor 51 is shifted back to its normal position, restoring the engagement of the pinions 61 and 60 and the fastening 100 is tightened; and (8) the motor circuit is connected to the power lines 76 and 77. Thereby the parts are at once set to conform to standard clock time and provision is made for initiating the upward movement of the lifting fork 62 at the changed time determined upon, which, in the example assumed, is at 8 p. m.

The circuit of the lamp 74 is closed for a determined period after the commencement of working hours. For example, assuming that working hours commence at 8 a. m., the lamp circuit may be closed for a period of three hours, i. e., from 8 a. m. to 11 a. m.

The specific time at which the lamp circuit is closed is determined by clamping the arm 124 to the dial plate 105 with its pointer 127 in radial alinement with the fixed pointer 104 and the corresponding hour designation on the dial plate 105. For example, if the lamp circuit is to be closed at 8 a. m. the pointers 104 and 127 (the arm 124 being clamped to the dial plate) are in alinement with the numeral "8" on the a. m. side of the dial plate as shown in Figure 20, this numeral, of course, being within the working hour division 148 of the face of the dial plate.

With the arm 124 set for the initial closing of the lamp circuit at the time determined upon and, as thus set, clamped to the dial plate 105, the duration of the closing of the lamp circuit and the specific time at which the lamp circuit is opened is determined by the position of the arm 125 with reference to the arm 124 and to the dial plate. Thus with the arm 124 set to initiate the closing of the lamp circuit at 8 a. m. the arm 125 is clamped to the dial plate in a position wherein its pointer 127 is in alinement with the 11 a. m. marking of the dial plate.

The arms 124 and 125 as thus set and clamped to the dial plate will move the dial plate in the course of its normal clockwise rotation. At 8 a. m. the arm 124, connected, as above described, to the cam plate 107 to cause the cam plate to move with the dial plate, will effect the closing of the lamp circuit at the contact elements 91. At 11 a. m., unless the lamp circuit has been previously opened manually by the depression of the lever 161, the arm 125 will automatically trip the bell crank lever 134 to release the spring fingers 90 and 89 and thereby effect the opening of the lamp circuit.

The lamp 74 provides a sustained reminder to the clerk in charge of the machine that service cards are awaiting attention. The clerk will ordinarily remove the service cards S from the raised pockets during the period when the lamp circuit is closed, take care of the customer notification and entries on the record cards, and relocate the service cards in appropriate pockets 22 or 23. Having done this the clerk releases the deployed units 24, permitting their return to their normal lower positions in which they effect the opening of the conditioning switch 82. In the event of a day, such as a holiday, when the establishment may be closed and the clerk is not present to attend to the machine, the arm 125 at the expiration of the determined period will automatically open the lamp circuit, all as above explained.

Circumstances may arise, such, for example, as the absence of the clerk during morning hours, when it may be desired to extend the period in which the lamp circuit is closed or temporarily to establish an additional period. In such a case the lamp circuit is manually closed by depressing the lever 138 and remains closed until the bell crank lever 134 is tripped, either by the manual operation of the release lever 141 or automatically by the arm 125.

Since the arms 124 and 125 are individually freely adjustable about the sleeve 106 as an axis and the arc subtended by the arms determines the duration of the closure of the lamp circuit, the specific times at which the lamp circuit is closed and opened and the corresponding duration of its period of closure may be varied according to choice by appropriate adjustment of the position of the arms relatively to one another and to the dial plate. The adjustment is quite simple and may be made at any convenient time, otherwise suitable. For example, with arms 124 and 125 set as above described, if it be desired that the lamp circuit be closed at 7 a. m. and opened at noon, the arm 124 is unclamped from the dial plate, moved counterclockwise to a position with its pointer 127 in alinement with the 7 a. m. indication on the dial plate and reclamped to the dial plate; and the arm 125 is similarly unclamped from the dial plate, moved clockwise to a position with its pointer 127 in alinement with the noon indication on the dial plate and reclamped to the dial plate, such adjustable movement of the arm 125 effecting a corresponding shifting of the position of the cam plate 107. Of course, if the adjustment of the time of opening the lamp circuit be to an earlier hour, in which case the adjustable movement of the arm 125 is counterclockwise, the adjustment must be made at a time when the cam lugs 111 and 112 are suitably distant from the extensions 110 and 109 of the respective leaf spring elements 90 and 89.

The service cards

The service cards S are shown in detail in Figures 15 and 33. Their principal function is to identify the customer whose car needs attention and they are conveniently and preferably utilized for keeping a record of services rendered. In general, each card S has at its upper end a section 149 for identification data, e. g., the customer's name, car, license number, address and other pertinent information. Below the section 149 a section 150 is preferably provided for the dates, charges and employee's identification in connection with unnamed extra services. The standard service identification section, designated generally as 151, is immediately below the section 150 and its marginal portion, at the left, contains designations of various services which are required from time to time in the upkeep of a motor car. The service identifying section 151 preferably comprises two divisions 152 and 153 respectively. The upper division 152 is devoted to special services performed at irregular times such as work on the motor, major repair work of one kind or another, work on the cooling system, electrical system, brakes, steering gear, body tightening, chassis repairs, work having to do with appearance of the car such as body and fender work, washing and polishing, and miscellaneous items of work and service. The lower division 153 is devoted to routine work, which is required to be performed at regular intervals, i. e., various phases of lubrication and other items such as radiator flushing service, oil filter service, shock absorber service, air cleaner service, lubricating oil renewal, chassis lubrication and the renewal of transmission and differential lubricants, all of which items being periodically recurrent at regular intervals may be conveniently grouped under a general designation such as "lubrication." The service card also preferably includes a lower section 154 for the identification of dates or work, job numbers on particular dates, and speedometer readings on particular dates. The sections 150, 151 (with its divisions 152 and 153) and 154 are divided into vertical columns which are severally related to the dates of particular jobs and into horizontal columns which are severally related to the particular jobs performed on these dates. The sections 150 and the divisions 152 and 153 of the section 151 also preferably include spaces to be filled in with the amounts charged for the particular work or services.

The vertical and horizontal division lines which form the several columns provide a series of rectangular spaces, "squares," which are utilized in keeping a record of the particular job, its date and the charge therefor. For example, John Doe had a change of lubricating oil on the 15th of January. The date, job number and speedometer reading are marked on his service card in the appropriate squares in the first available vertical column (reading from the left) on section 154. He required eight quarts of oil. The numeral "8" is written in the appropriate square in section 153, that is to say, the square in vertical alinement with the marked squares of section 154 and in horizontal alinement with the marginal designation "oil—qts." In the upper square of section 153 and in the same vertical column with the other designations the amount of the charge is written, e. g., if the oil be 30¢ per quart the amount "$2.40" will be written into the appropriate square. Other jobs, routine or special, are similarly marked in their appropriate squares.

Believing that further elaboration is unnecessary, it will be sufficient to point out that the service cards, by virtue of the features described, serve for the recording in all essential detail of each item of work or supplies in connection with the upkeep of a motor car and thereby enable the clerk in charge of the machine to notify customers of particular services that may be needed and when they are needed, the card carrier, as above described, providing for the original and, if necessary, follow-up notifications to a reasonable extent.

The record cards

The record card R (Figures 26, 29 and 34) consists of two major (outer and inner) sections 155 and 156 joined by a folding line 157 and each having vertical blank columns headed by appropriate titles or captions and subdivided horizontally to provide, for dating purposes, "squares" to be filled in by the clerk with pertinent data. The section 155 has at one end a projection 158 which bears the name of the customer, the identity of his car, his car license number, and other appropriate information. The sections 155 and 156 have certain columns, e. g. the two vertical columns at the left side of the section 155, which provide for the recording of the numbers of the pockets 23 and 22 (outer or inner as the case may be) in which the corresponding service card may be filed at a time contemporaneous with the last entry on the record card. The projection 158 constitutes an identification tab which enables the convenient selection of the record card in the cabinet (wells 17) in which it may be filed and its convenient removal. The section 156 has a rectangular window 159 covered by a panel 160 of suitable stencil material. The section 156 also has at its upper end an extension 161 to which it is connected by a transverse folding line 162. The extension 161 is provided for the protection of the panel of stencil material, for the protection of the adjoining record card, for carrying any printed instructions which may be required, and for the purpose of a guide element in connection with the ejectile movement of the record card from the address and stamp applying mechanism A as will be later described in detail. When the record card is in the filing cabinet the extension 161 is folded upon the section 156 in order to protect the stencil material from dust or smearing. The extension 161 preferably bears upon the face which becomes its inner face when the section is folded, a coating 163 of any suitable varnish occupying a suitable rectangular area as shown in Figure 34, the purpose of which is to prevent the extension 161 from adhering to the ink impregnated panel 160 and to prevent the ink adhering to said panel from seeping through the thin cardboard of which the extension 161 is composed and smearing the surface of the section 155 of the adjacent record card. In the folded relation of the parts the section 155 protects the opposite face of the stencil panel 160 against dust and smearing.

The upper edge of the section 155 may be regarded as marked off by a printed line 164 and the upper edge 165 of the section 156 and the folding line 162 coincide with the line 164 whereby, with the parts in folded relation, the projection 158 extends as a tab beyond the upper edge of the card. The section 156 at its lower edge and adjacent the folding line 157 has a cut-away portion which provides a recess 166.

The "mailing piece," which term is to be understood as comprehending postcards, pamphlets and folders to be directly stamped and addressed, and envelopes, has the usual spaces for the postage stamp and address. In the use of the record cards for the stamping and addressing of mailing pieces the sections 155 and 156 are folded one upon the other with the data bearing side of the section 155 exposed. The mailing piece is inserted between the sections 155 and 156 to the extent limited by its engagement with the meeting edges of the sections as connected along the folding line 157. In such insertion the stamp bearing portion of the mailing piece is located in registry with the recess 166, the edge portion of the mailing piece is located in contacting engagement with the meeting edges of the sections 155 and 156 (i. e., the folding line 157) and the address bearing portion of the mailing piece is located in registry with the panel 160.

The record card, with the mailing piece thus associated with it and with its extension 161 in projected relation, is then introduced into the address and stamp applying mechanism (Figures 25 and 29).

The record card includes a vertical column bearing the caption "Date" in which the dates of customer notification are entered in the appropriate squares by the clerk. The record card also includes a column bearing the caption "Contact Description" in which the clerk enters an indication of the nature of the contact with the customer i. e. mail, telephone or personal call and, in the usual event that the contact is by mail an indication of the mailing piece or pieces sent to the customer, it being understood that the mailing pieces are severally identified by numbers, code words or other symbolic identification. For the purpose of adequate capacity several series of columns may be provided for the identification of the particular pocket 23 or 22 in which the customer's service card is filed, for the entry of the date of customer notification and for the entry indicative of the particular customer contact. As shown, the outer section 155 bears two series of such columns and the inner section 156 bears a single series.

Let it be assumed that customer John Doe is to be notified of service needed. The fact that John Doe's car needs service is indicated by the deployment of his service card by the filing machine, all as above described. Upon such deployment John Doe's service card is removed from the filing machine and his record card is removed from the cabinet (well 17). His service card shows the nature of the service or services needed. His record card shows whether there has been any previous contact or contacts concerning such service. The information supplied by the service card and record card, considered in combination, enables the clerk to determine the character of notification required and, if the notification be by mail, the identity of the particular mailing piece or mailing pieces to be sent. With these facts determined, John Doe's service card is relocated in the filing machine as above described and an entry of the particular pocket in which it is relocated is made in the appropriate square of one of the columns of the record card devoted to service card pocket identification. The contemporaneous date of the notification is then entered in the corresponding square of the "Date" column and a description of the notification or "contact" is entered in the corresponding square of the "Contact Description" column. If the contact is to be by mail the mailing piece is inserted between the sections 155 and 156 of John Doe's record card R, as above described, and as indicated by dot and dash lines in Figure 26; and his record card with its extension 161 in projected relation is then inserted into the address and stamp applying mechanism as shown generally in Figure 29.

It will be noted that the record card, properly filled out as just described, provides an immediate contemporaneous identification of the location of John Doe's service card in the filing machine. Thus when John Doe responds to a notification, and brings his car in for service the clerk consults John Doe's record card and thereby ascertains the location of his service card in the filing machine. When the service which the car requires has been completed appropriate entries as to the specific service or services, the date thereof, the charges therefor, and other desirable pertinent information are entered upon John Doe's service card which is then so relocated in the filing machine that it will be deployed at the next date when any further particular service or services may be required. The identity of the pocket in which John Doe's service card is then relocated is entered upon his record card R; the date is entered in the corresponding square of the "Date" column of his record card; and any appropriate symbolic indication of the fact as to the services rendered is entered in the corresponding square of the "Contact Description" column of his record card. On the next deployment of John Doe's service card an appropriate notification is given him, the date entered in the next successive square in the "Date" column, an indication of the particular notification entered in the corresponding square of the "Contact Description" column, and the identity of the pocket in which his card is relocated in readiness for a repeat notification is entered in the corresponding square of either of the outer or inner pocket identification columns.

The address and stamp applying mechanism

The address and stamp applying mechanism A and associated parts are mounted within the drawer element 8 (Figures 8 and 24) between the vertically extending portions 9 of its side walls and also between lower and upper horizontal plates 167 and 168 provided along their longitudinal edges with angular flanges 169 by means of which they may be attached in any suitable manner to the wall portions 9, the plates 167 and 168 connecting and mutually bracing the wall portions 9 and completing the structure of the drawer element 8. The elements of the mechanism A are directly supported by a vertically planar transverse plate 170 (Figure 3), the vertical edge portions of which are attached, preferably by screws 171 (Figure 24) to the inner faces of the co-planar flanges of angle brackets 172 which in turn are secured, preferably by welding, to the side wall portions 9 of the drawer element 8. The plate 170 adjacent its front face supports the elements of the address and stamp applying mechanism and adjacent its rear face supports an associated motor and gearing.

The plate 170 is provided with a horizontal shelf 173 which projects forward from its front face and supports the record card R in cooperative relation to the elements of the mechanism A. The shelf 173 is provided on its upper face with shoulders 174 and 175 in right angular relation, the shoulder 174 being parallel to the plate 170 and provided by a rib 189 integrally formed with the plate 170 and the shoulder 175 extending forward from the inner end of the shoulder 174. The shoulders 174 and 175 constitute an L-shaped positioning guide for the record card to insure its proper location in cooperative relation to the elements of the mechanism A.

Access to the mechanism A for the purposes of replenishing ink, inserting a new roll of stamps, and lubrication is provided for by the hinged upper panel 12 of the drawer element front wall 11 (Figures 2, 8 and 24), the panel 12 being provided on its inner face with a latch 176 by which it may be held in closed position and which cooperates in the usual manner with a keeper which may consist of a flange 176a forming a part of the frame of the drawer element 8. The panel 12 has on its outer face and adjacent its free vertical edge a knob 177 (Figure 2) by means of which it may be conveniently opened and closed.

The record card with the associated mailing piece is moved into cooperative relation with the elements of the mechanism A through a horizontal slot 178 (Figure 2) in the front wall of the drawer element 8 and is partially ejected (by the movable address applying elements) through an angular slot continuation 179 (Figure 3) in the vertical wall 9 at which the slot 178 terminates, the record card extension 161 being introduced into the slot 179 when the record card is inserted. The slot 178 is formed by cutting away the lower edge of the panel 12 and may be bounded by a U-shaped reinforcing frame 180, one element of which is attached to the panel 12 and the other element of which is attached to the upper edge of the section of the front wall 11 below the panel 12.

Acknowledging the signal of the lamp 74 the clerk moves the cabinet cover elements 3 and 4 and the drawer element 8 to open positions; and removes the deployed service cards and the corresponding record cards. When notifications by mailing pieces are appropriate, the mailing piece is inserted between the record card sections 155 and 156 as above explained. The drawer element 8 in its open position (Figure 3) enables the insertion of the record card and mailing piece into operative relation and enables the record card to be moved through the slot 179 to ejectile position. The open drawer element 8 also provides additional support for the open cover element 4 when used by the clerk as a desk in connection with the association of the mailing piece with the record card and making the entries on the cards.

The stamp applying device, indicated generally as 181, may be of any suitable known construction (for example as shown in Patent No. 1,877,849, issued September 20, 1932) which includes an actuating plunger 182 projecting beyond the casing 183 of the device and normally held in projected relation, the plunger 182 being pushed inward in order to cause the application of the stamp to the mailing piece and being automatically raised by its loading spring when released, all as taught in the patent above identified. The casing 183 includes a bottom plate 184 and the shelf 173 is provided with a raised platform 185 upon which the plate 184 is supported. The platform 185 provides the shoulder 175 above described and is formed with an upwardly projecting forwardly extending flange 186 parallel to the shoulder 175. A groove 187 is formed in the inner face of the flange 186, the bottom wall of the groove being flush with the surface of the platform 185 and the upper wall of the groove being provided by a portion 188 which overhangs the platform 185 and is a part of the flange 186. The plate 170 is provided with a forwardly projecting lug 190 having its inner vertical face provided with a groove 191 which confronts and is coplanar with the groove 187, the bottom wall of the groove 191 merging with the upper face of the rib 189 which provides the shoulder 174. The stamp applying device 181 is supported directly by the platform 185, the rib 189 and the lug 190, its bottom plate 184 resting upon the platform 185 and upon the upper face of the rib 189 and its end edge portions fitting within the grooves 187 and 191. Thereby the stamp applying device is accurately positioned and is positively held against canting or upward displacement. The stamp applying device 181 is a self-contained unit which may be removed and replaced at will. As positioned upon the platform 185, the rib 89 and the lug 190 it is normally held against outward displacement by a spring finger 181a (Figures 27 and 31) secured to and projecting forward from the plate 170.

The address applying device includes upper and lower roller quadrants 192 and 193 (Figure 24) mounted on shafts 194 and 195 respectively. The upper quadrant 192 is provided with a facing 196 of suitable absorbent ink carrying and applying material and is movable in relation to an ink roll 197 arranged in contacting arrangement above it and at the lower end of an ink reservoir 198. The ink is viscid and the reservoir 198 is provided with a gravity operating ink forcing plunger 199 having a guide stem 200 which projects through a central opening in the cap 201 by which the upper end of the reservoir 198 is closed, the cap being freely removable from the reservoir whenever the supply of ink is to be replenished.

Figure 31:
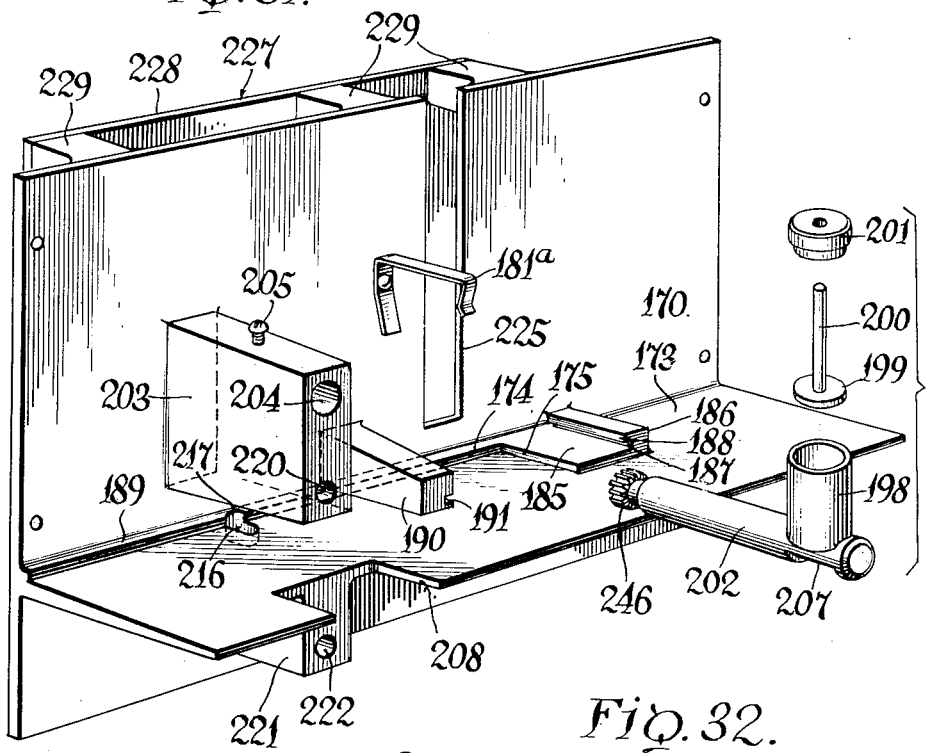
Figure 31 is a perspective view of a supporting plate for various elements of the address and stamp applying mechanism with certain associated parts also shown in perspective.

The reservoir 198 is carried by a supporting sleeve 202 with which it is preferably formed integral, as best shown in Figure 31. The plate 170 is provided with a forwardly projecting block 203 having an opening 204 which extends through the plate 170 and in which the sleeve 202 is fitted, the sleeve being secured by a screw 205 tapped into the block 203. The sleeve 202 provides a bearing for a shaft 206 (Figure 27) which carries the inking roller 197, the reservoir 198 having in its bottom a diametrical opening which is occupied by the inking roller, and the sleeve 202 having a bottom opening 207 through which the inking roller is exposed for contacting engagement with the absorbent facing 196 of the quadrant 192.

The quadrant 193 is mounted below the shelf 173 and a marginal recess 208 (Figure 31) is formed in the shelf to accommodate the peripheral portion of the quadrant 193 during its operative movement, such peripheral portion in its operative phase being at least flush with, and preferably slightly above, the upper surface of the shelf 173. The quadrants 192 and 193 are normally in a position in which their adjacent ends are spaced, thereby to provide for the convenient introduction between them of the record card with an interposed mailing piece. The quadrants 192 and 193 are operatively movable through a full circle, the quadrant 192 being movable clockwise and the quadrant 193 being movable counter clockwise. The quadrants are initially so positioned that their peripheral surfaces will not engage the record card until after the operation of the stamp applying device has been completed at which time the quadrants seize the record card R and cooperate with the panel 160 of stencil material to effect the addressing operation. In such operation the quadrants 192 and 193 also move the record card to partially ejected position. When the ejectile movement of the record card has been completed the quadrants will have returned to their normal inactive position shown in Figure 24 and will have released the record card. The record card is guided in its ejectile movement by the shoulder 174. Its extension 161 at all times projects through the slot extension 179 and serves as a guide element. In its partially ejected position the record card projects through the slot extension 179 and its folded sections 155 and 156 may be readily grasped by the operator in effecting the complete removal of the record card from the drawer element 8.

The stamp and address applying devices are operated by a motor 209 (Figures 25 and 28) through suitable gearing designated generally as 210. The motor 209 is normally idle and is operative only during the period when the record card with its interposed mailing piece is in association with the mechanism A, the operation of the motor being automatically initiated by the record card and being continued only during a period of the movement of the record card as effected by the quadrants 192 and 193.

Figure 5:
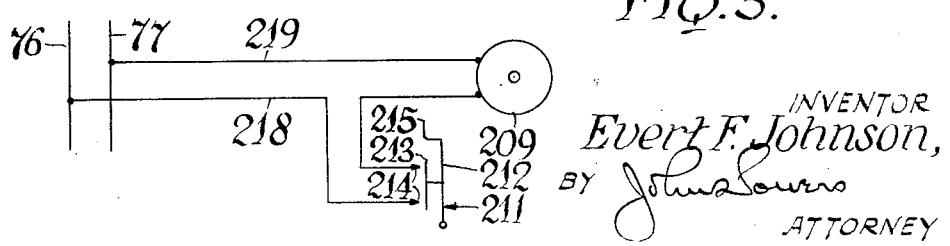
Figure 5 is a diagram showing the circuit for the operation of the address and stamp applying mechanism.
Figure 6:
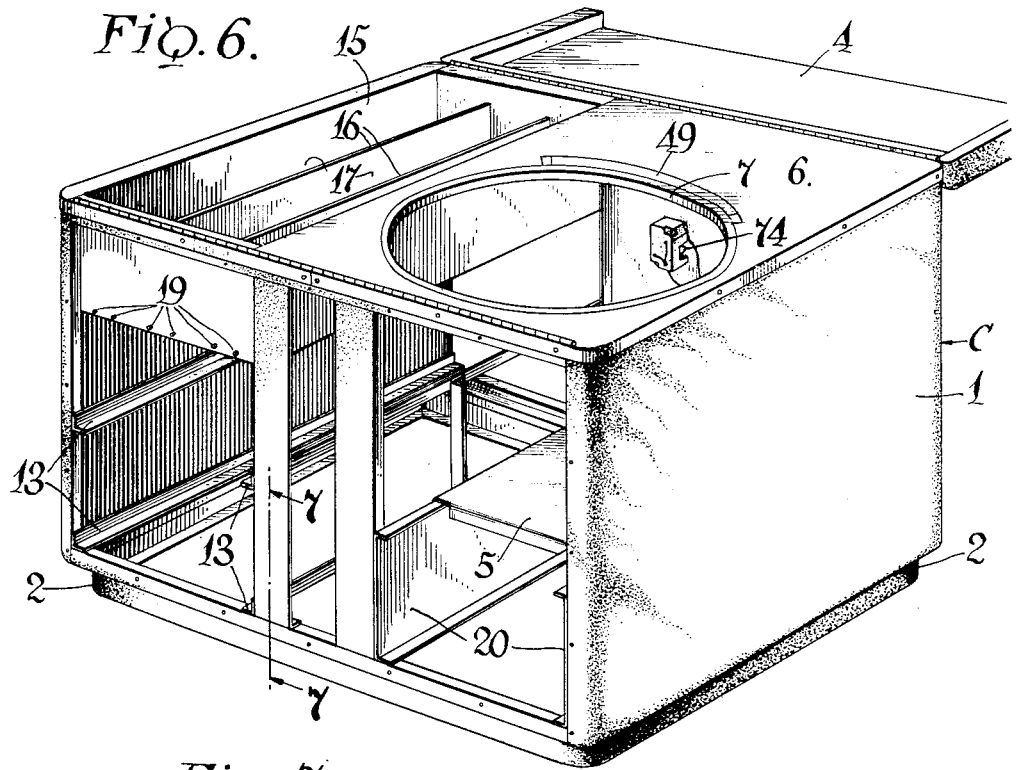
Figure 6 is a perspective view from the rear of the cabinet per se, its rear wall and the filing machine being omitted in order ot promote clarity of illustration.
Figure 7:
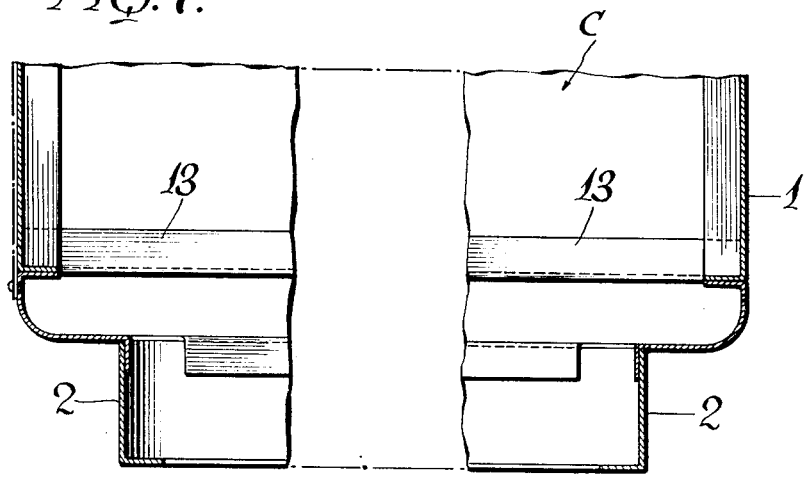
Figure 7 is a vertical longitudinal section in the plane 7—7 of Figure 6, looking in the direction of the arrows, with certain parts shown in elevation.

The circuit of the motor 209 (Figure 5) is controlled by a normally open switch designated generally as 211 (Figure 28), preferably of the micro-type, which is closed, and held closed, by the record card. The switch 211 carries an externally mounted leaf spring 212 connected to a movable contact element 213 within the switch casing. The spring 212 normally assumes a position in which the contact 213 is disengaged from its companion stationary contacts 214. At its free end the spring 212 carries an upwardly projecting finger 215 extending through an opening 216 in the shelf 173 and communicating with a recess 217 in the shoulder 174. The finger projects beyond the upper face of the shelf 173 and into the path of the record card as inserted into operative relation to the mechanism A. The folded edge of the record card engages the finger 215 and moves it into the recess 217, the finger 215 thereby effecting the inward movement of the spring 212 and the engagement of the contact element 213 with the contacts 214 with resultant closure of the circuit of the motor 209. This circuit includes lines 218 and 219 connected to the respective power lines 76 and 77 and, in series, connected by the motor features and terminating in the contacts 214.

The block 203 is provided with an opening 220 which extends through the plate 170 and in which the shaft 194 is journalled. The plate 170 is also provided with a forwardly projecting block 221 located adjacent the underface of the shelf 173 and in vertical alinement with the block 203, the block 221 being formed with an opening 222 which extends through the plate 170 and provides a journal for the shaft 195. The quadrants 192 and 193 are mounted fast upon the portions of the shafts 194 and 195 which project forward beyond the blocks 203 and 221. The shafts 194 and 195 are symmetrically located with reference to the shelf 173 and project inwardly beyond the plate 170.

The plunger 182 of the stamp applying device 181 is automatically operated, that is to say depressed, and released for return movement, by a vertically movable slide 223 (Figures 27, 28 and 30) having at its upper end a forwardly projecting arm 224 which overhangs and engages the upper end of the plunger 182 (the arm 224 being shown in plan in Figure 30 in dot and dash lines). The slide 223 is movable in a vertical slot 225 (Figure 31) formed in the plate 170 and open to its upper edge, the slide being guided in its vertical movement and held against displacement from the plate. For these purposes the slide is formed in its side face with grooves 226 into which the portions of the plate 170 adjacent the vertical walls of the slot 225 project.

The plate 170 forms a wall of a gear casing 227, the other wall of which is provided by a plate 228 located in spaced relation behind, and supported by the plate 170, the plate 228 in turn providing direct support for the motor 209. For the support of the plate 228 the plate 170 is formed with a number of suitably located rearwardly projecting lugs 229 to which the plate 228 is attached by screws 230 (Figure 25).

The casing of the motor 209 is provided at its sides with angle brackets 231 (Figure 27) which are attached by screws 232 to the plate 228 adjacent its rear face. The projecting end of the shaft 233 of the motor 209 carries a worm 234 (Figure 25) which meshes with a worm wheel 235 mounted on a shaft 228. The reduction gearing which includes the worm 234 and the worm wheel 235 is otherwise mounted in the gear casing 227 and its various elements serve for the operation of the quadrants 192 and 193, the inking roller 197 and the slide 223.

Figure 32:
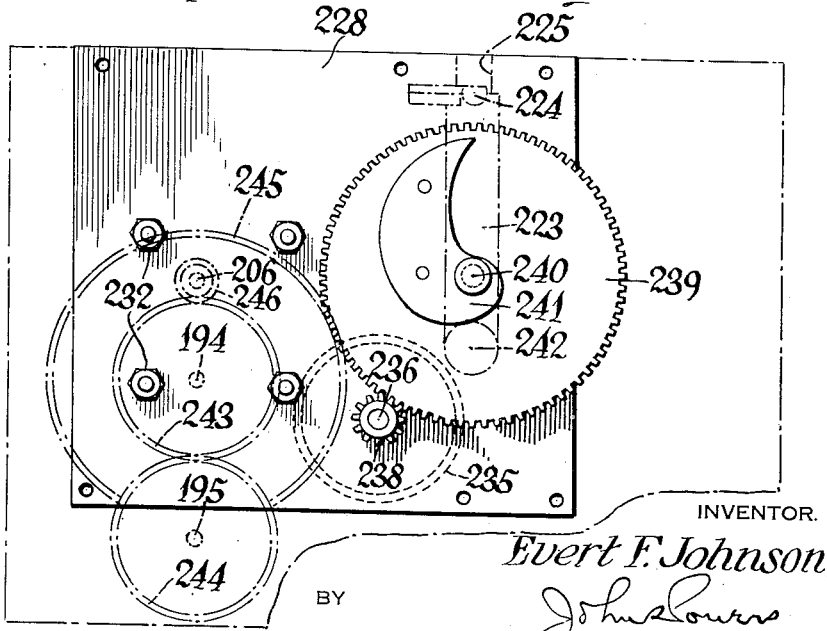
Figure 32 is an elevation of certain gear elements employed in the operation of the address and stamp applying mechanism with certain parts shown in full lines and other related parts indicated in broken lines.

The worm wheel shaft 236 carries within the gear casing 227 a pinion 238 (Figures 28 and 32) which meshes with a substantially larger pinion 239 mounted upon an arbor 240 supported by the plate 228. The pinion 239 has attached to it a cam 241 arranged in the space between it and the plate 170, the cam being movable through a single revolution in its operative phase. The slide 223 is provided at its lower end and within the gear casing with a laterally projecting roller 242 which is engaged by the active surface of the cam 241 (Figures 25, 28 and 32). As viewed in Figure 25 (broken lines) the rotation of the cam 241 is clockwise and in such rotation the cam, acting on the roller 242, depresses the slide 223 with resultant depression of the plunger 182 in its stamp affixing operation. When this operation has been completed the cam 241 passes beyond the roller 242 whereupon the plunger 182 is raised by its spring (not shown) and as it moves to its upper position raises the slide 223, returning it to its normal elevated position in which the roller 242 is positioned for another engagement by the cam 241.

At the inner side of the plate 170 the shafts 194 and 195 carry meshing pinions 243 and 244 (Figures 27 and 32) located within the gear casing 227 and of equal diameters whereby the shafts will be driven at equal speeds and in opposite directions. The upper shaft 194 also carries a pinion 245 of the same diameter as, and in mesh with, the pinion 239 which, therefore, serves not only for the operation of the cam 241 but also, through the gears 245, 243 and 244, for the operation of the quadrant shafts 194 and 195.

The shaft 206 which carries the inking roller 197 projects beyond the inner side of the plate 170 and carries a small pinion 246 in mesh with and driven by the pinion 243. Thereby the pinion 243 in addition to rotating the shaft 194 and effecting the operation of the quadrant 192 also, during each operation of the quadrant, causes a number of revolutions of the inking roller 197 whereby the ink will be effectively and uniformly distributed upon the absorbent facing 196 of the quadrant 192 during each operation of the quadrant.

I claim:

1. An automatic follow-up card file holding and designating machine comprising a card carrier movable through an orbital path and having a series of pockets for customer service cards, carrier operating means including a shaft which makes one revolution daily and effects the movement of the carrier through its orbital path in a determined number of days and its movement each day through the distance of a pocket, the pockets corresponding in number to the number of days required for the orbital movement of the carrier, means operative daily for deploying the service cards in the several pockets at a fixed point in the orbital path of the carrier and including a vertically movable post having a normal position below the card carrier, a motor for the carrier, gearing between the motor and the shaft, and operative connections between the shaft and the card deploying means consisting of an arm upon the shaft and a projection provided as a part of the card deploying means, the arm engaging and disengaging the projection at successive periods of each revolution of the shaft, the arm during its engagement with the projection effecting the upward movement of the post and the post in its upward movement effecting the deployment of the vertically adjacent service cards.

2. An automatic follow-up card file holding and designating machine comprising a card carrier mounted for rotation about a vertical axis and having an annular series of pockets for customer service cards, means for effecting a revolution of the card carrier about its vertical axis in a predetermined number of days and in a day of twenty-four hours through a distance equivalent to the width of a pocket, the pockets corresponding in number to the number of days required for a revolution of the card carrier, and means defining a restricted service needed zone comprising two visual fixed earlier and later terminal points of reference mutually spaced through an arc subtending a predetermined number of days as a determined fraction of the predetermined number of days in which the card carrier is movable through a revolution about its vertical axis, two of the pockets spaced correspondingly to the extent of the service needed zone being in daily alinement with the two terminal points of reference, the cards being available for discretional arrangement with respect to the pockets within the service needed zone, thereby to enable their repetitious coincidence with the later point of reference.

3. A machine as set forth in claim 2 wherein the service needed zone is defined by two spaced pockets as daily visually deployed relatively to the remaining pockets and means, operative once daily, is provided for effecting the deployment of such pockets by moving them to a position beyond the remainder of the pockets.

4. A machine as set forth in claim 2 wherein the service needed zone is defined by two spaced pockets as daily visually deployed relatively to the remaining pockets, means, operative once daily, is provided for effecting the deployment of such pockets by lifting them to an elevation above the remainder of the pockets, and the service needed zone is cumulatively defined by a fixed day scale arcuate and externally concentric to the carrier and calibrated with respect to successive days.

5. A machine as set forth in claim 2 wherein each pocket bears a number visual during the operation of the machine and the numbers of the several pockets comprising the complete series are in consecutive order.

6. An automatic follow-up card file holding and designating machine comprising a card carrier mounted for rotation about a vertical axis and having a series of pockets for customer service cards, means for effecting a revolution of the card carrier about its vertical axis in a predetermined number of days, and in a day of twenty-four hours through a distance equivalent to the width of a pocket, the pockets corresponding in number to the number of days required for a revolution of the card carrier, and means defining a restricted service needed zone comprising two visual fixed earlier and later terminal points of reference mutually spaced through an arc subtending a predetermined number of days as a determined fraction of the predetermined number of days in which the card carrier is movable through a revolution about its vertical axis, two of the pockets spaced correspondingly to the extent of the service needed zone being in daily alinement with the two terminal points of reference, said means comprising a fixed day scale arcuate and externally concentric to the carrier and calibrated with respect to successive days, the cards being available for discretional arrangement with respect to the pockets within the service needed zone, thereby to enable their repetitious coincidence with the later point of reference.

7. A machine as set forth in claim 6 wherein the pockets are provided in two annular concentric inner and outer series and in like number in each series, the pockets of each series being severally in alinement with the corresponding pockets of the other series and each pair of alining pockets being permanently physically connected for revoluble movement in unison as parts of the card carrier.

8. A machine as set forth in claim 2 wherein the pockets are provided in two annular concentric inner and outer series and in like manner in each series, the pockets of each series being severally in alinement with the corresponding pockets of the other series and each pair of alining pockets being permanently physically connected as a unit structurally independent of the other similar units whereby each unit participates in the revoluble movement of the carrier and is also shiftable relatively to the remainder of the units, and means, operative once daily, as provided for defining the service needed zone by means of two spaced units as daily visually deployed and is operative to shift and thereby deploy such units relatively to the remainder of the units.

9. A machine as set forth in claim 8 wherein the means which shifts the units is engageable with the bottom of a pocket of each unit to be shifted and shifts the units by raising them to elevations above the remainder of the units.

10. An automatic follow-up card file holding and designating machine comprising as companion elements a card carrier having a series of pockets for customer service cards and means for demarking a point of reference in respect to the service cards which require attention, the companion elements being relatively movable through an orbital path, means for effecting their relative movement through the orbital path in a predetermined number of days and in a day of twenty-four hours through a distance equivalent to the width of a pocket, the pockets corresponding in number to the number of days required for the completion of the relative movement of the companion elements through the orbital path and the service cards in the several pockets in successive relation being in daily coincidence with the demarked point of reference, each pocket being displaceable relatively to the remaining pockets, the means for demarking the point of reference consisting of means operative daily for effecting the displacement of a pocket relatively to adjacent pockets, thereby to deploy the service cards in the successive order of the pockets, and manually releasable means for latching each pocket in the position into which it is moved by the pocket displacing means.

11. An automatic follow-up card file holding and designating machine comprising as companion elements a card carrier having a series of pockets for customer service cards and means for demarking a point of reference in respect to the service cards which require attention, the companion elements being relatively movable through an orbital path, and means for effecting their relative movement through the orbital path in a predetermined number of days and in a day of twenty-four hours through a distance equivalent to the width of a pocket, the pockets corresponding in number to the number of days required for the completion of the relative movement of the companion elements through the orbital path and the service cards in the several pockets in successive relation being in daily coincidence with the demarked point of reference, the pockets having bottom walls and the means for demarking the point of reference effecting an upward movement of a pocket relatively to adjacent pockets and including a vertically movable post engageable with the bottom walls of the several pockets and having a normal position below the card carrier.

12. An automatic follow-up card file holding and designating machine comprising as companion elements a card carrier having a series of pockets for customer service cards and means for demarking two constantly spaced earlier and later points of reference in respect to the service cards which require attention, the spaced points of reference delimiting a service needed zone in which the cards may be discretionally rearranged for repetitious coincidence with the later point of reference, the companion elements being relatively movable through an orbital path, and means for effecting the relative movement through the orbital path in a predetermined number of days and in a day of twenty-four hours through a distance equivalent to the width of a pocket, the pockets corresponding in number to the number of days required for the completion of the relative movement of the companion elements through the orbital path and the service cards in the several pockets in successive relation being in daily coincidence with the two spaced demarked points of reference, the pockets being structurally independent of one another, having bottom walls and each being upwardly movable relatively to adjacent pockets and the means for demarking the spaced points of reference including a lifting fork vertically movable and having spaced upright terminal posts located below the pockets and engageable with their bottom walls to effect their upward movement.

13. An automatic follow-up card file holding and designating machine comprising as companion elements a card carrier having a bottom plate and a series of pockets for customer service cards supported upon the bottom plate and each movable upward relatively to adjacent pockets and means for demarking a point of reference in respect to the service cards which require attention, the companion elements being relatively movable through an orbital path, means for effecting their relative movement through the orbital path in a predetermined number of days and in a day of twenty-four hours through a distance equivalent to the width of a pocket, the pockets corresponding in number to the number of days required for completion of the relative movement of the companion elements through the orbital path and the service cards in the several pockets in successive relation being in daily coincidence with the demarked point of reference, the means for demarking the point of reference effecting the upward movement of a pocket relatively to adjacent pockets, thereby to deploy the service cards, the pockets having bottom walls provided with openings and also having end walls, and vertical rods carried by and projecting upwardly from the bottom plate, extending through the openings in the bottom walls of the pockets, adjoining the end walls of the pockets and serving to guide the pockets in their movement by the demarking means and to prevent their radial and peripheral displacement relatively to the bottom plate.

14. An automatic follow-up card file holding and designating machine comprising as companion elements a card carrier having a bottom plate and a series of pockets for customer service cards supported upon the bottom plate, and means for demarking a point of reference in respect to the service cards which require attention, the companion elements being relatively movable through an orbital path, means for effecting their relative movement through the orbital path in a predetermined number of days and in a day of twenty-four hours through a distance equivalent to the width of a pocket, the pockets corresponding in number to the number of days required for completion of the relative movement of the companion elements through the orbital path and the service cards in the several pockets in successive relation being in daily coincidence with the demarked point of reference, a driven hub secured to and located below the bottom plate and a fixed plate which is engaged by the hub as a support, the card carrier and the hub constituting a unit removable and replaceable relatively to the fixed plate.

15. An automatic follow-up card file holding and designating machine comprising as companion elements a card carrier having a series of pockets for customer service cards and means for demarking a point of reference in respect to the service cards which require attention, the pockets being structurally independent of one another, having normal lower positions and each being movable upward relatively to adjoining pockets, the means for demarking the point of reference consisting of means operative daily for effecting the upward movement of a pocket relatively to adjacent pockets, thereby to deploy the service cards in the successive order of the pockets, means for effecting the relative movement of the companion elements through the orbital path in a predetermined number of days and in a day of twenty-four hours through a distance equivalent to the width of a pocket, the pockets corresponding in number to the number of days required for the completion of the relative movement of the companion elements through the orbital path, the card carrier having a top plate formed with openings, and spring fingers severally carried by the pockets and projecting through the openings, the fingers having a shoulder which, when the pocket is moved upward, engages and cooperates with the top plate in a latching function, the fingers being manually operable to disengage the top plate and permit the return of the pockets to their normal lower positions.

16. An automatic follow-up card file holding and designating machine comprising as companion elements a card carrier having a series of pockets for customer service cards and means for demarking a point of reference in respect to the service cards which require attention, the companion elements being relatively movable through an orbital path, means for effecting their relative movement through the orbital path in a predetermined number of days and in a day of twenty-four hours through a distance equivalent to the width of a pocket, the pockets corresponding in number to the number of days required for completion of the relative movement of the companion elements through the orbital path and the service cards in the several pockets in successive relation being in daily coincidence with the demarked point of reference, the card carrier having a bottom plate upon which the pockets are supported and the pockets being independently movable relatively to one another, the means for demarking the point of reference effecting the movements of the pockets in the order of their succession, a central vertical shaft projecting upward from the bottom plate, a top plate secured to the upper end of the shaft, and manually releasable means for latching the pockets in the positions into which they are severally moved by the demarking means, the top plate constituting an element of the latching means.

17. An automatic follow-up card file holding and designating machine comprising as companion elements a rotatable card carrier having a series of pockets for customer service cards and means for demarking a point of reference in respect to the service cards which may require attention, means, including a shaft, for rotating the card carrier through a revolution in a predetermined number of days and in a day of twenty-four hours through a distance equivalent to the width of a pocket, the pockets corresponding in number to the number of days required for the completion of a revolution of the card carrier and the service cards in the several pockets in successive relation being in daily coincidence with the demarked point of reference, a pinion mounted upon the shaft, a motor for driving the carrier rotating means, a pinion mounted upon the motor shaft and meshing with the pinion first named, the pockets being mounted for independent movement relative to one another and the means for demarking the point of reference effecting the movements of the pockets in the order of their succession and including a pocket lifting element arranged under the carrier and engageable with the bottoms of the pockets, an arm on the shaft of the carrier operating means, and a projection on the pocket lifting element, the arm engaging and disengaging the projection at successive periods of each revolution of the shaft of the carrier operating means and during its engagement effecting the upward movement of the lifting element, the motor being mounted for shiftable adjustment whereby the pinion on its shaft may be disengaged from the pinion on the shaft of the carrier operating means, thereby to permit adjustment of the shaft of the carrier operating means for the purpose of predetermining the hour at which the arm engages the projection.

18. An automatic follow-up card file holding and designating machine comprising as companion elements a card carrier having a series of pockets for customer service cards and means for demarking a point of reference in respect to the service cards which require attention, the companion elements being relatively movable through an orbital path in a predetermined number of days and in a day of twenty-four hours through a distance equivalent to the width of a pocket and the pockets corresponding in number to the number of days required for the completion of the relative movement of the companion elements through the orbital path and being independently movable relatively to one another, the means for demarking the point of reference effecting the movement of the pockets in the order of their succession, thereby to deploy the cards, a motor for the operation of the means for effecting the relative movement of the companion elements through the orbital path, an electric signal lamp indicative of cards requiring attention as indicated by their deployment, a normally open conditioning switch and a normally open closing switch in the circuit of the lamp, the conditioning switch being held normally open by the several pockets as they are brought into relation to it by the relative movement of the companion elements and being automatically closed when a pocket, operating as a lamp circuit controlling pocket, is moved by the card deploying means, and means actuated by the motor for causing the closing of the closing switch and its subsequent opening upon the expiration of a predetermined period of time.

19. An automatic follow-up card file holding and designating machine comprising as companion elements a card carrier having a series of pockets for customer service cards and means for demarking a point of reference in respect to the service cards which require attention, the companion elements being relatively movable through an orbital path, means for effecting their relative movement through the orbital path in a predetermined number of days and in a day of twenty-four hours through a distance equivalent to the width of a pocket, the pockets corresponding in number to the number of days required for completion of the relative movement of the companion elements through the orbital path and the service cards in the several pockets in successive relation being in daily coincidence with the demarked point of reference, an electric signal lamp indicative of the coincidence of cards with the point of reference, a normally open conditioning switch and a normally open closing switch included in the circuit of the lamp, means providing for the automatic closure of the conditioning switch when the cards are brought into relation to the demarked point of reference and motor actuated means for causing the closing of said closing switch and its subsequent opening upon the expiration of a predetermined period of time.

20. A machine as set forth in claim 13 wherein the card carrier includes a central vertical shaft and a top plate, the bottom and top plates being secured to the shaft and certain of the vertical rods are connected to the top plate to serve the additional function of tie rods for the connection of the top plate to the bottom plate.

21. A machine as set forth in claim 13 wherein the card carrier includes a central vertical shaft and a top plate, the bottom and top plates being secured to the shaft, certain of the vertical rods are connected to the top plate to serve the additional function of tie rods for the connection of the top plate to the bottom plate, and manually releasable means is provided for latching the pockets in the position into which they are severally moved by the demarking means, the top plate constituting an element of the latching means.

EVERT F. JOHNSON.

REFERENCES CITED

The following references are of record in the file of this patent:

UNITED STATES PATENTS

| Number | Name | Date |
| --- | --- | --- |
| 1,281,380 | Ise | Oct. 15, 1918 |
| 1,577,592 | Robertson et al. | Mar. 23, 1926 |
| 2,314,705 | Johnson | Mar. 23, 1943 |

Certificate of Correction

Patent No. 2,532,364 December 5, 1950

EVERT F. JOHNSON

It is hereby certified that error appears in the printed specification of the above numbered patent requiring correction as follows:

Column 1, line 41, for the word "from" read *for*; column 6, line 56, strike out "preferably" and insert the same in line 55, before "severally";

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*